United States Patent
Klein

(10) Patent No.: US 11,479,094 B2
(45) Date of Patent: Oct. 25, 2022

(54) STORAGE UNIT HAVING ADJUSTABLE VOLUME

(71) Applicant: Amos Klein, Haifa (IL)

(72) Inventor: Amos Klein, Haifa (IL)

(*) Notice: Subject to any disclaimer, the term of this patent is extended or adjusted under 35 U.S.C. 154(b) by 0 days.

(21) Appl. No.: 17/621,980

(22) PCT Filed: Mar. 18, 2021

(86) PCT No.: PCT/IL2021/050306
§ 371 (c)(1),
(2) Date: Dec. 22, 2021

(87) PCT Pub. No.: WO2021/186452
PCT Pub. Date: Sep. 23, 2021

(65) Prior Publication Data
US 2022/0242208 A1  Aug. 4, 2022

(30) Foreign Application Priority Data
Mar. 19, 2020 (IL) .......................... 273467

(51) Int. Cl.
| | |
|---|---|
| *B60J 7/06* | (2006.01) |
| *B60J 7/04* | (2006.01) |
| *B60J 7/14* | (2006.01) |
| *B60J 7/02* | (2006.01) |

(52) U.S. Cl.
CPC ............. *B60J 7/062* (2013.01); *B60J 7/026* (2013.01); *B60J 7/041* (2013.01); *B60J 7/141* (2013.01)

(58) Field of Classification Search
CPC ... B60J 7/026; B60J 7/041; B60J 7/062; B60J 7/141; B60J 7/16; B60J 7/1607

USPC .......................................... 296/100.01, 100.03
See application file for complete search history.

(56) References Cited

U.S. PATENT DOCUMENTS

| | | | |
|---|---|---|---|
| 3,889,432 A | 6/1975 | Geihl | |
| 4,084,851 A | 4/1978 | Duncan, Sr. | |
| 4,252,363 A * | 2/1981 | Rodrigue | B60J 5/14 |
| | | | 160/84.01 |
| 4,603,658 A | 8/1986 | Garnsey | |
| 4,659,136 A | 4/1987 | Martin et al. | |

(Continued)

FOREIGN PATENT DOCUMENTS

| | | | | |
|---|---|---|---|---|
| CA | 2638493 A1 * | 2/2010 | ............. | B60J 7/062 |
| JP | H05270274 A | 10/1993 | | |
| KR | 200186503 Y1 | 6/2000 | | |

*Primary Examiner* — Jason S Daniels
(74) *Attorney, Agent, or Firm* — William H. Dippert; Laurence A. Greenberg; Werner H. Sterner

(57) ABSTRACT

A rigid extendable storage unit that comprises a front wall and a back wall positioned adjacent to the front wall in a folded state and configured to be deployed opposite the front wall, wherein the back wall has an opening configured to be covered. Side walls that are made of at least one section are provided and positioned adjacent to the front wall in a folded state and extended between the front wall and the back wall in a deployed state. A roof is positioned adjacent to the front wall in a folded state and extended to enclose a volume formed between the front wall, the back wall and the side walls. In the folded state, the extendable storage unit occupies minimal area of the surface or the platform it is mounted on and transforming the storage unit from folded state to deployed state and vice versa can be handled manually or automatically.

7 Claims, 19 Drawing Sheets

(56) References Cited

U.S. PATENT DOCUMENTS

| | | | |
|---|---|---|---|
| 4,784,429 A | 11/1988 | Hodges | |
| 4,974,898 A * | 12/1990 | Baranski | B60J 7/047 |
| | | | 220/345.5 |
| 5,203,603 A * | 4/1993 | Hertzberg | B60J 7/041 |
| | | | 296/100.03 |
| 5,556,156 A | 9/1996 | Kirk | |
| 5,839,864 A | 11/1998 | Reynard | |
| 6,244,651 B1 * | 6/2001 | Hecock, Jr. | B60J 7/062 |
| | | | 296/100.11 |
| 7,261,362 B1 | 8/2007 | Mendez | |
| 9,862,333 B1 | 1/2018 | Jones | |
| 2008/0088151 A1 | 4/2008 | Shagbazyan | |
| 2010/0264180 A1 | 10/2010 | Allotey | |
| 2010/0289291 A1 * | 11/2010 | Ting | B60J 7/1614 |
| | | | 296/100.17 |
| 2011/0316302 A1 * | 12/2011 | Lenz, Jr. | B60J 7/026 |
| | | | 296/100.03 |
| 2012/0235439 A1 * | 9/2012 | Mazur | B60J 7/062 |
| | | | 296/100.03 |
| 2013/0300148 A1 * | 11/2013 | Sinkauz | B60J 7/026 |
| | | | 296/100.03 |
| 2015/0197141 A1 | 7/2015 | Cortez | |
| 2019/0061496 A1 * | 2/2019 | Singer | B60J 7/08 |
| 2019/0061497 A1 | 2/2019 | Trinier | |
| 2019/0210664 A1 | 7/2019 | Williams | |
| 2019/0359042 A1 * | 11/2019 | Singer | B60J 7/141 |
| 2021/0370750 A1 * | 12/2021 | Singer | B60J 7/102 |

* cited by examiner

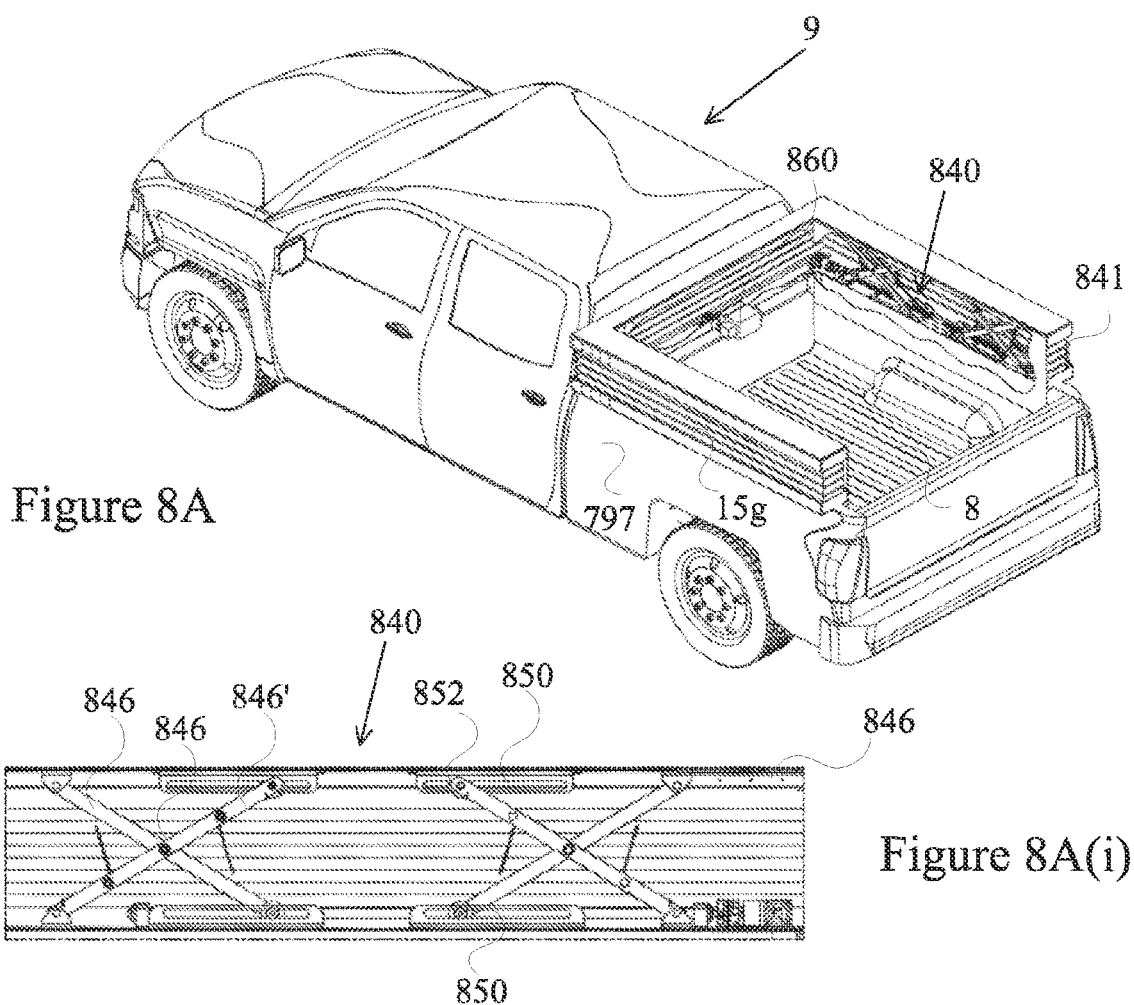
Figure 8A
Figure 8A(i)
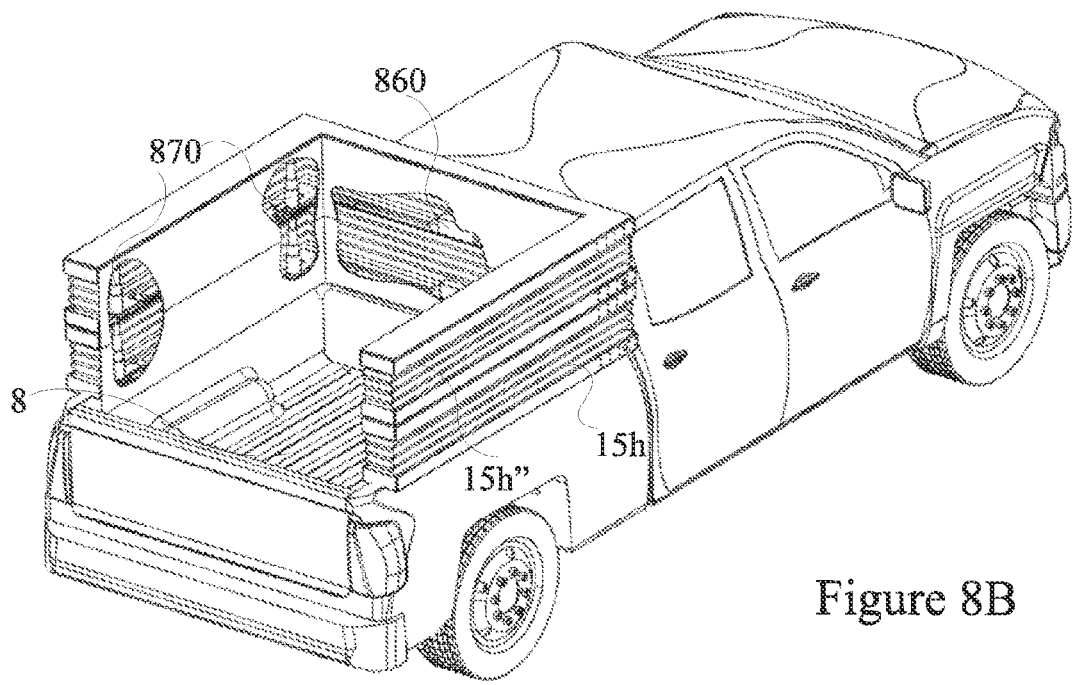
Figure 8B

STORAGE UNIT HAVING ADJUSTABLE VOLUME

CROSS-REFERENCE TO RELATED PATENT APPLICATIONS

This patent application is a U.S. National Phase filing under 35 U.S.C. § 371 of PCT Patent Application No. PCT/IL2021/050306, filed Mar. 18, 2021, which is based upon and claims the priority of Israeli Patent Application No. 273467, filed Mar. 19, 2020, each of which is incorporated herein by reference in its entirety.

TECHNICAL FIELD

The present disclosed subject matter relates to storage units having adjustable volume to be used on platforms and especially with vehicles and light trucks. More particularly, the storage units can be folded when not in use, and can be extended to a desired volume when used.

BACKGROUND

Light trucks (pickup trucks) are in wide use for carrying people and cargo. Such trucks usually come with a passenger cabin and an open rear load area.

Fixed and removable enclosures (truck caps) for the rear load area are commercially available. However, installing and removing these enclosures is time consuming and requires tools and lifting devices. Once installed, these enclosures interfere with loading cargo onto the rear loading area. There is a need for enclosures that can be adjusted to the cargo that has to be uploaded onto the rear loading area of the truck.

There is also a need to provide volume adjustable storage units that can be placed on a platform or a surface where they occupy minimal volume when not in use and can be used for storing items of different volume at a time.

BRIEF SUMMARY

According to a preferred embodiment of the present subject matter, a rigid extendable storage unit is disclosed to be deployed on a surface of a vehicle or a platform, the extendable storage unit comprising:
  a front wall;
  a back wall positioned adjacent to said front wall in a folded state and configured to be deployed opposite the front wall, wherein the back wall has an opening configured to be covered;
  side walls, each of the side walls is made of at least one section and positioned adjacent to said front wall in a folded state and extended between the front wall and the back wall in a deployed state;
  a roof positioned adjacent to said front wall in a folded state and extended to enclose a volume formed between the front wall, the back wall and the side walls;
  wherein in the folded state, the extendable storage unit occupies minimal area of the surface or the platform and wherein transforming the storage unit from folded state to deployed state and vice versa can be handled manually or automatically.

In accordance with another preferred embodiment, the vehicle is a pickup truck and the surface is a rear load area and wherein the front wall is placed on the rear load area of the pickup truck towards a front of the vehicle.

In accordance with another preferred embodiment, wherein the back wall is configured to be extended along the rear load area while the opening is configured to be positioned adjacent to a tailgate of the pickup truck.

In accordance with another preferred embodiment, the side walls are extended to the sides of the vehicle.

In accordance with another preferred embodiment, said roof is hinges to a proximal edge of the front wall and is having an oppositely distal edge that is hinged to said back wall, and wherein in the folded state said back wall and said roof are stowed essentially parallel to said front wall.

In accordance with another preferred embodiment, in the folded state, said side walls are stowed essentially parallel to said front wall.

In accordance with another preferred embodiment, each of the side walls is hinged to corresponding a side edge of said front wall.

In accordance with another preferred embodiment, each of the side walls comprises a front side section and a back side section, and wherein the front side section is hinged to said front wall on its corresponding vertical edge, and to a vertical edge of the back side section while the opposite vertical edge of the back side section is hinged to a corresponding edge of said back wall.

In accordance with another preferred embodiment, said front wall is attached essentially vertically to said vehicle near its cabin.

In accordance with another preferred embodiment, said front wall is hinged to the rear load area of the pickup truck near its cabin so that the storage unit is configured to be stowed near the surface of the rear load area in the folded state and said front wall rotates to a vertical position to be ready to be unfolded.

In accordance with another preferred embodiment, each of the side walls comprises a stationary lower section and at least one movable section that is configured to be deployed into the deployed state.

In accordance with another preferred embodiment, said at least one movable section comprises a telescopic middle section that can slide upwardly along the stationary lower section.

In accordance with another preferred embodiment, said at least one movable section comprises a folding upper section hinged to a top edge of the stationary lower section.

In accordance with another preferred embodiment, said at least one movable section further comprises a folding upper section, hinged to a top edge of said telescopic middle section.

In accordance with another preferred embodiment, said stationary lower section is provided with an opening to correspond protrusions protruding from the surface.

In accordance with another preferred embodiment, a lower section of the side walls is provided with an opening to correspond protrusions in the surface, wherein the protrusions are back wheel bays of back wheel of the pickup truck.

In accordance with another preferred embodiment, said roof comprises a central roof section and two folding roof sections, each of the folding roof sections is hinged to a corresponding side edge of said central roof section.

In accordance with another preferred embodiment, said back wall comprises a central back wall section, hinged at its top edge to a corresponding edge of said central roof section, and two folding back wall sections, each one of said folding back wall sections is hinged to a corresponding edge of said central back wall section.

In accordance with another preferred embodiment, at least one of the roof sections or back wall sections is made of a flexible material.

In accordance with another preferred embodiment, the unit further comprising a cover mounted on the surface or platform and covers at least part of the top and the sides of the extendable storage unit.

In accordance with another preferred embodiment, the cover is made of a flexible material and can be stretched onto and withdrawn off the storage unit.

In accordance with another preferred embodiment, at least one of the middle sections or the upper sections of the side walls is provided with handles for facilitating moving the sections.

In accordance with another preferred embodiment, said front wall and said side walls are stationary relative to the surface of the platform and wherein the roof is made of a plurality of sliding sections, each of the plurality of sliding sections comprises two opposite edges that slide on corresponding portions of the side walls, and wherein the plurality of sliding sections are capable of sliding one on top of the other so that in a folded state, the plurality of sections is adjacent the front wall and when deployed, the sections are extended away from the front wall.

In accordance with another preferred embodiment, the surface is a rear load area of a pickup truck that has sides onto which the side walls of the extendable storage unit are mounted and wherein height adjustment mechanisms are provided within the side walls, wherein the height adjustment mechanisms are configured to elevate the extendable storage unit so as to increase an inner volume of the extendable storage unit when deployed.

In accordance with another preferred embodiment, two rails are provided, each of said rails is mounted on a corresponding side wall, and wherein at least one of said sliding sections is capable of sliding on the rails.

In accordance with another preferred embodiment, said two opposite edges of the sliding sections are provided with wheels capable of sliding along said rails.

In accordance with another preferred embodiment, the sliding sections are provided with a sliding back section capable of sliding back and forth between the folded state and the deployed state while in the deployed state, the sliding back section is adjacent to the back wall and the sliding sections are disposed one aside the other between the back wall and the front wall forming an enclosed volume.

In accordance with another preferred embodiment, the unit further comprising a telescopic back wall mounted adjacent to the tailgate of the pickup truck and is telescopically moving.

In accordance with another preferred embodiment, said sliding back section further comprising a shutter in the back wall acting as a door for said extendable portable storage unit.

In accordance with another preferred embodiment, said opening is provided with a door.

An extendable rigid storage unit is also disclosed as a preferred embodiment, to be deployed on a pickup truck having a cabin and a rear load area having sides and tailgate, the extendable storage unit comprising:

a stationary front wall having a length that is slightly shorter than a length between the sides of the rear load area, wherein the front wall is on the rear load area adjacent to the cabin or the tailgate;

side walls mounted on the sides of the rear load area;

two rails, each mounted on a corresponding side wall;

a sliding back wall positioned opposite said front wall and capable of sliding on said two rails;

at least one sliding section disposed between the stationary front wall and the sliding back wall, wherein the at least one sliding sections are capable of sliding on said two rails wherein in a folded state, the at least one sliding section and the back wall are adjacent to the front wall and in a fully deployed state or partially deployed state, the at least one sliding section is positioned aside the sliding back wall to form an enclosed volume; and wherein in the folded state, the extendable storage unit occupies minimal area of the rear load area and in the deployed state or the partially deployed state, the sliding back wall is configured to extend away from the front wall while when the back wall reaches the tailgate or the cabin, respectively, the extendable storage unit occupies a maximal area while the back wall can be fixed in any distance on the rear load area from the front wall.

In accordance with another preferred embodiment, transforming the storage unit from the folded state to the deployed state and vice versa can be handled manually, mechanically, electrically, or automatically.

In accordance with another preferred embodiment, the side walls height is adjustable.

In accordance with another preferred embodiment, the sliding sections and the sliding back wall are arched and have lower edges that are provided with wheels capable of sliding within and along the rails.

In accordance with another preferred embodiment, the front wall is a part of a frame that is configured to accommodate the back wall, the side walls and the roof.

In accordance with another preferred embodiment, each of the side walls is accommodating a height adjustment mechanism.

In accordance with another preferred embodiment, the height adjustment mechanism is based on rods connected by a hinge so as to form a scissor-like jack.

In accordance with another preferred embodiment, the scissor-like jack is enhanced by springs.

In accordance with another preferred embodiment, the height adjustment mechanism is based on hydraulic or pneumatic telescopic cylinder.

In accordance with another preferred embodiment, the side walls are enveloping a height adjustment mechanism and are made of a sheet of metal that is arranged in an accordion shape that can be extended and retracted according to an extend of height that the height adjustment mechanism reaches. It is also provided in accordance with yet another embodiment of the present subject matter Height adjustable side walls for a pickup truck having a rear load area with sides, the height adjustment side walls comprising:

side walls configured to be mounted on the sides of the rear load area wherein the side walls can change their height;

height adjustment mechanism accommodated within the side walls, wherein the height adjustment mechanism is configured to change the height of the side walls.

In accordance with another preferred embodiment, the height adjustment mechanism comprises scissor-like jack.

In accordance with another preferred embodiment, the height adjustment mechanism comprises telescopic cylinders.

In accordance with another preferred embodiment, the height adjustment mechanism is enhanced by springs.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings:

FIG. 2D schematically illustrates a foldable storage unit, in accordance with another exemplary embodiment of the disclosed subject matter.

FIG. 8A schematically illustrates a pickup truck with height adjustment mechanism within a side platform having a portion cut-off so as to observe the interior, in accordance with some exemplary embodiments of the disclosed subject matter.

FIG. 8A(i) schematically illustrates a side view of a height adjustment mechanism, in accordance with some exemplary embodiments of the disclosed subject matter.

FIG. 8B schematically illustrates a pickup truck with double height adjustment mechanism having a portion cut-off so as to observe the interior, in accordance with some exemplary embodiments of the disclosed subject matter.

DETAILED DESCRIPTION

Figure 1A:
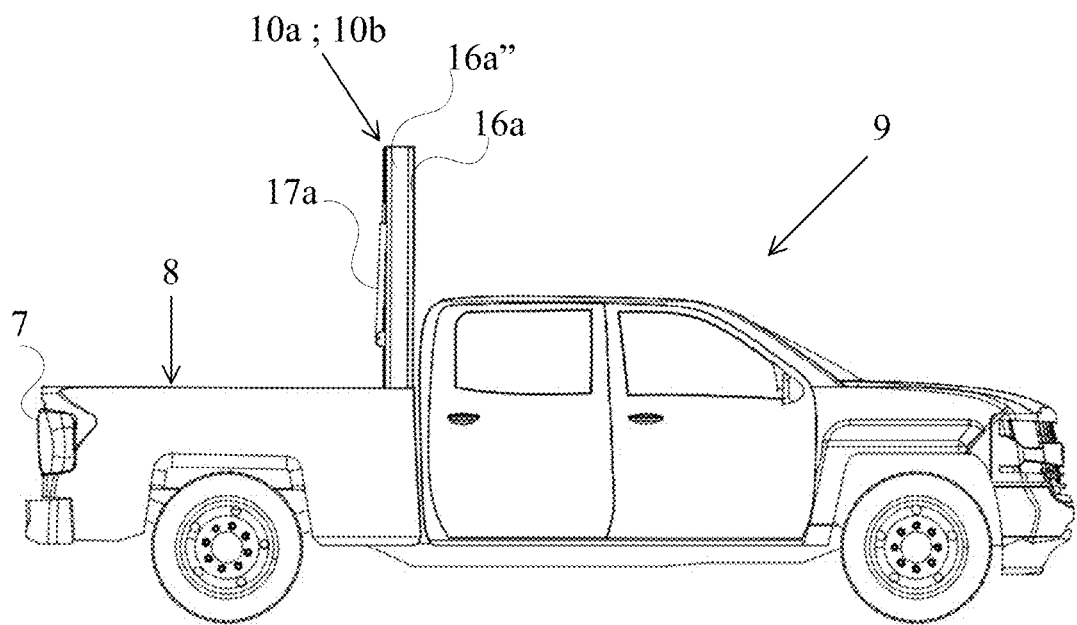
FIG. 1A schematically illustrates a pickup truck with a foldable storage unit in folded state, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

In discussion of the various figures described herein below, like numbers refer to like parts. Specifically, a numeral followed by a letter such as "a" or "b" may mark similar elements.

Although the examples discussed in this document deal especially with installation of the expandable or extendable storage units on vehicles such as trucks, ships, trains, etc., the units can also be installed on a platform that is not transportable.

It is provided in accordance with a preferred embodiment, a storage unit that can be of an adjustable volume that is provided to be installed on a platform, wherein the storage unit is configured to be in a minimal volume when not in use and in a desirable volume or adjustable volume when used.

For simplifying the drawings, some elements numbers were omitted as well as parts of the truck.

Figure 1B:
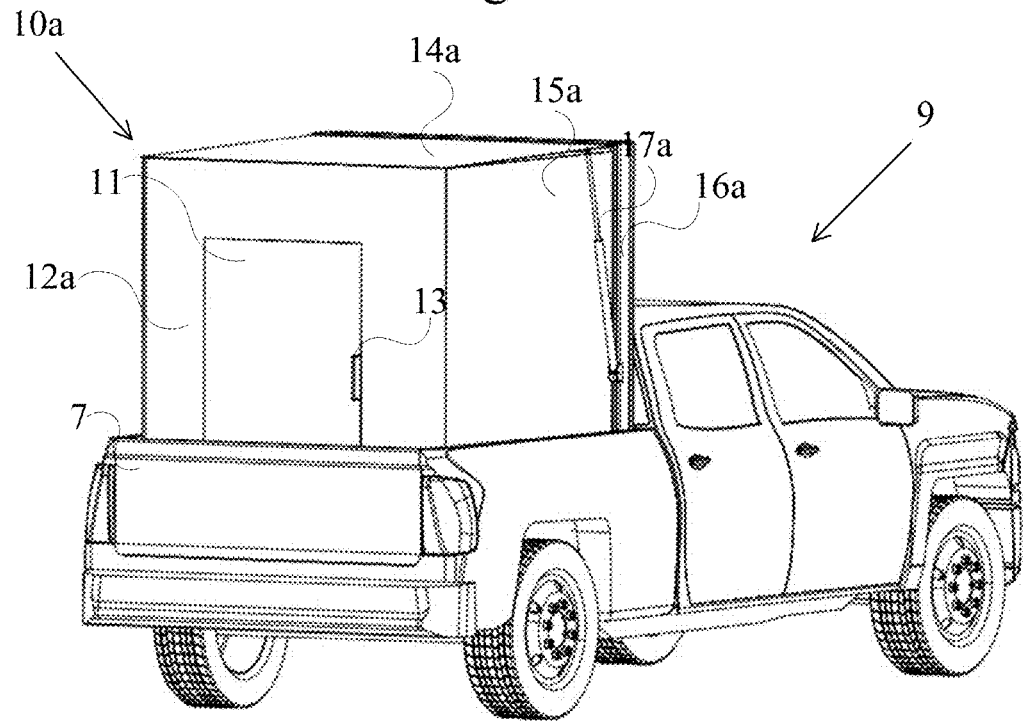
FIG. 1B schematically illustrates a pickup truck with a foldable storage unit in deployed state, in accordance with some exemplary embodiments of the disclosed subject matter.

Referring now to FIG. 1A and FIG. 1B schematically illustrating a pickup truck with a foldable storage unit in folded state and deployed state, respectively, in accordance with some exemplary embodiments of the disclosed subject matter.

The foldable storage unit 10a is folded and deployed while installed on the rear load area 8 of a pickup truck 9. The foldable storage unit 10a comprises a back wall 12a with a door 11, optionally having a lock 13; a roof 14a; two side walls 15a (only one is seen in this figure); a front wall 16a, and optionally, an unfolding mechanism 17a that can be manual or automatic as well as controlled through the truck or independently.

Entering the foldable storage unit 10a may require opening a tailgate 7 of the truck at the back of pickup truck 9.

The roof 14a, the back wall 12a, and the side walls 15a, are all folded through hinges. The method of unfolding and folding of the storage unit 10a will be explained herein after in FIGS. 3A to 3E. The foldable storage unit 10a is folded adjacent to the front wall 16a, that may have a frame 16a", which has a width that contains the folded parts of the storage unit. Foldable storage unit 10b will be detailed in FIGS. 2A to 2C; the appearance of the different foldable storage units 10a and 10b are similar in their folded state. Other possibilities are available.

The rear load area 8 of pickup truck 9 is exposed and cargo can be loaded and unloaded without interference. Due to the ease of placing and removing the storage unit on the rear load area, different types of storage units can be placed and attached to the rear load area while the storage units may have different volumes according to the need of the users.

Figure 1C:
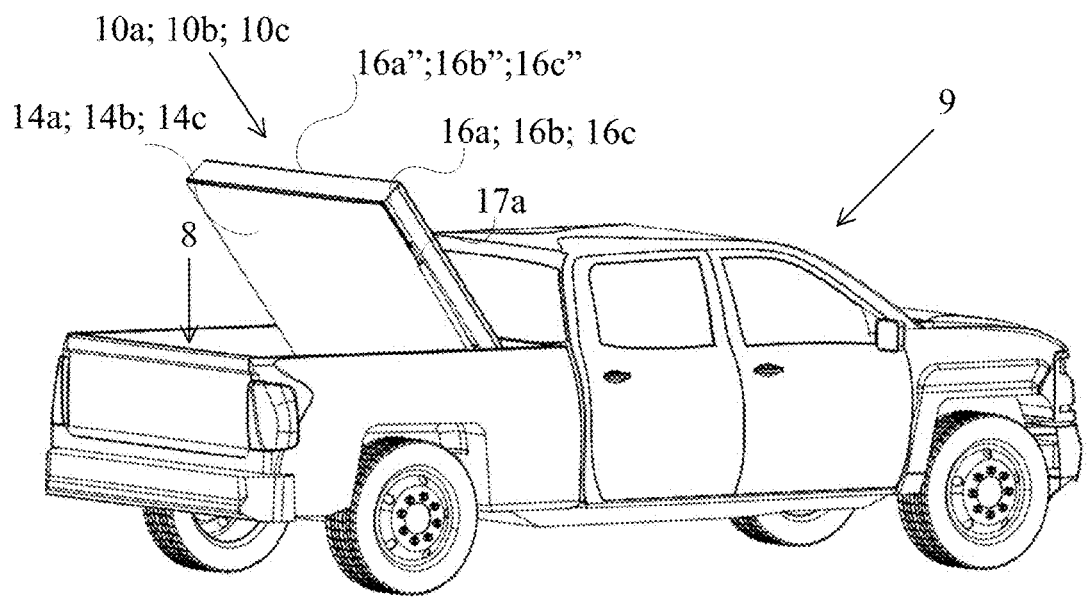
FIG. 1C schematically illustrates the pickup truck with the foldable storage unit in the folded state in an intermediate position, in accordance with some exemplary embodiments of the disclosed subject matter.
Figure 1D:
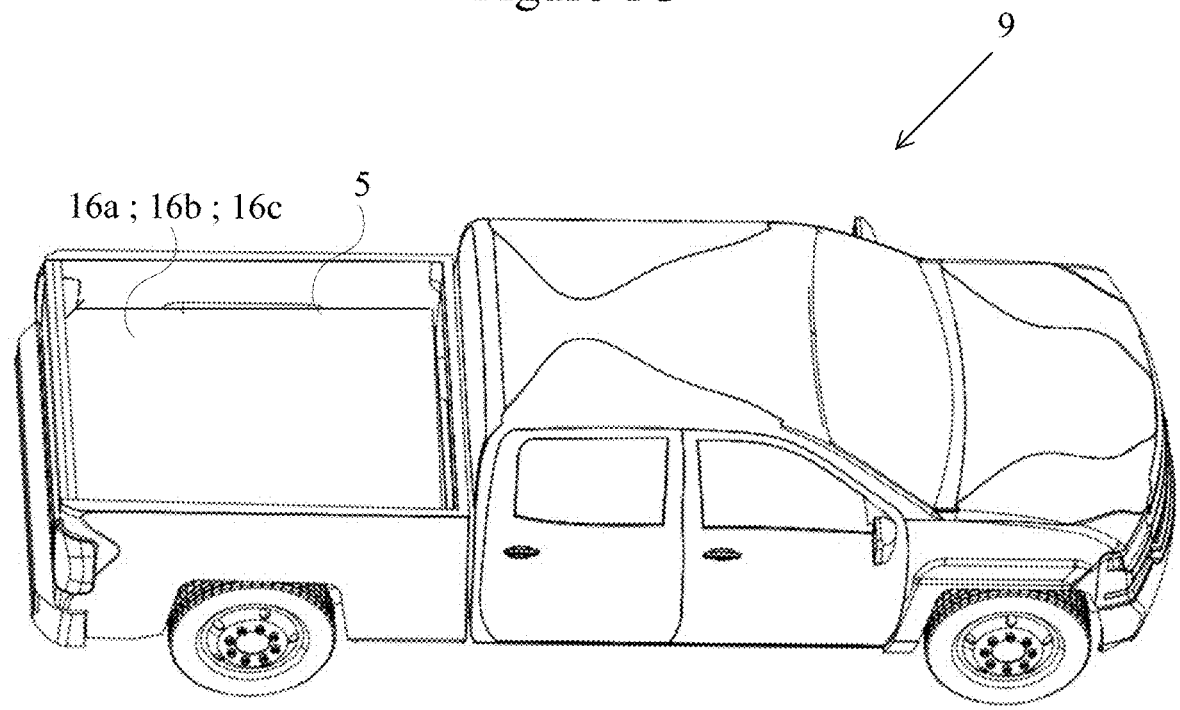
FIG. 1D schematically illustrates the pickup truck with the foldable storage unit in the folded state and in an unused position, in accordance with some exemplary embodiments of the disclosed subject matter.

Referring now to FIGS. 1C and 1D schematically illustrating the pickup truck with the foldable storage unit in the folded state in an intermediate position and in an unused position, in accordance with some exemplary embodiments of the disclosed subject matter.

In a folded state and not in use, foldable storage units 10a, 10b, or 10c (shown in FIGS. 4A to 4E) and other storage units shown herein or similar units can be stowed on the floor of rear load area 8 of pickup truck 9 as shown in FIG. 1D. The front wall 16a, b, or c acts as a floor to the rear load area 8 and cargo may normally be loaded onto the pickup truck 9 while the storage unit in this case has no effect as to the volume that can be loaded onto the rear load area. When the storage unit is not in used and placed as shown in this figure, the presence of the storage unit on the rear load area is not disturbing the uploading of the rear load area with cargo as well as the aerodynamic structure of the vehicle. FIG. 1C illustrates the erection of the foldable storage unit 10a, b, or c from the floor of the pickup truck 9 and into an upright state from which the unit can be extended or deployed. It should be noted that almost all the embodiments shown herein can be reclined onto the rear load area 8 and be erected in order to be deployed and used. Preferably, an automatic erection mechanism is used.

Front wall erecting mechanism 17a can be a hydraulic piston, an electrical motorized actuator, or a manual jack type mechanism providing sufficient force to lift the front wall 16a, b, c with roof 14a, b, c and back wall 12a, b, c that are folded within it.

Note that front wall assembly 16a, b, and c are optionally as wide as the width of the rear load area 8, and thus rests folded above the back wheel bays 5 which may protrude above the floor surface of the rear area.

FIG. 1C schematically shows the front wall 16a, b, or, c that borders the assembly of the folded storage unit 10a, b, and c within the wall frame 16"a, b, or c in between the upright state and stowing state. This figure exposes the roof 14a, b, or c oppositely bordering the assembly.

Note that front wall 16a, b, or c as well as the roof and the back wall are substantially wide as the width of the rear load area 8, and thus rests folded above the back wheel bays 5 which may protrude above the floor surface of the rear area.

Figure 2A:
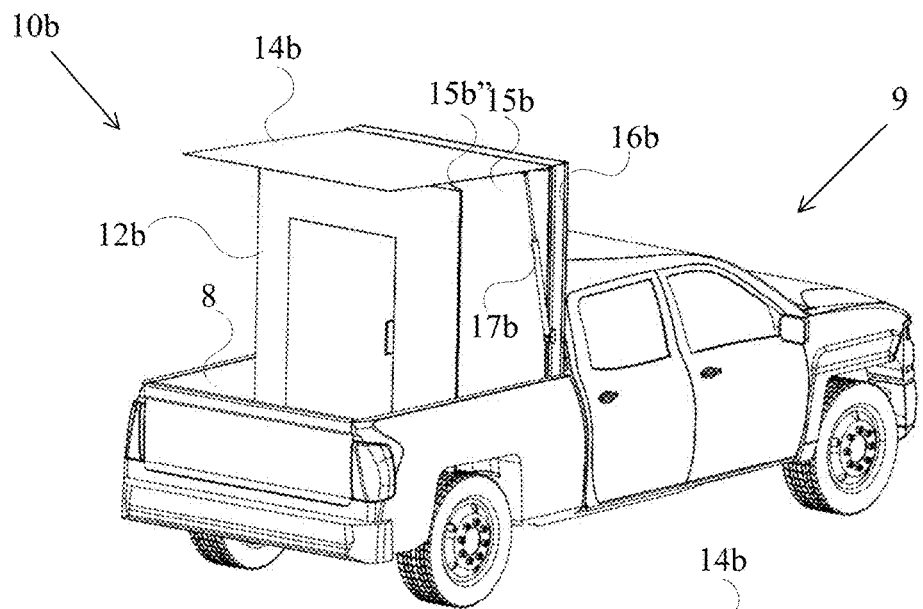
FIGS. 2A to 2C schematically illustrate stages in deploying a foldable storage unit from folded state shown in FIG. 1A, in accordance with an exemplary embodiment of the disclosed subject matter. More particularly, FIG. 2C also schematically illustrates the state of the foldable storage unit as shown in FIG. 2A; however it is shown in the absence of the truck for reasons of clarity.
Figure 2C:
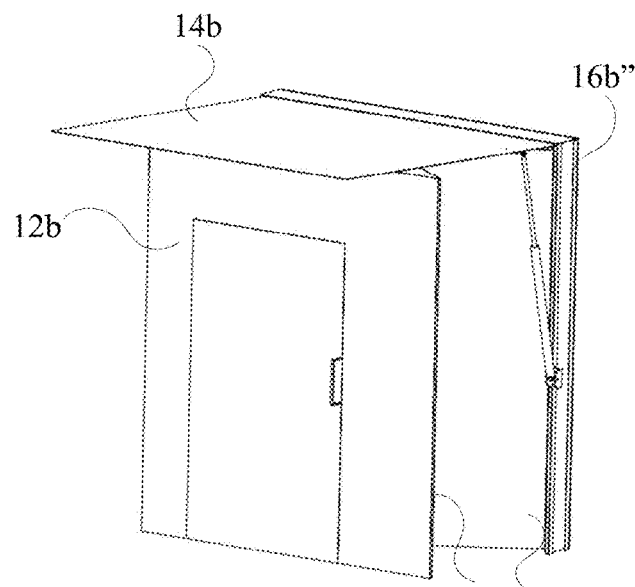
Figure 2B:
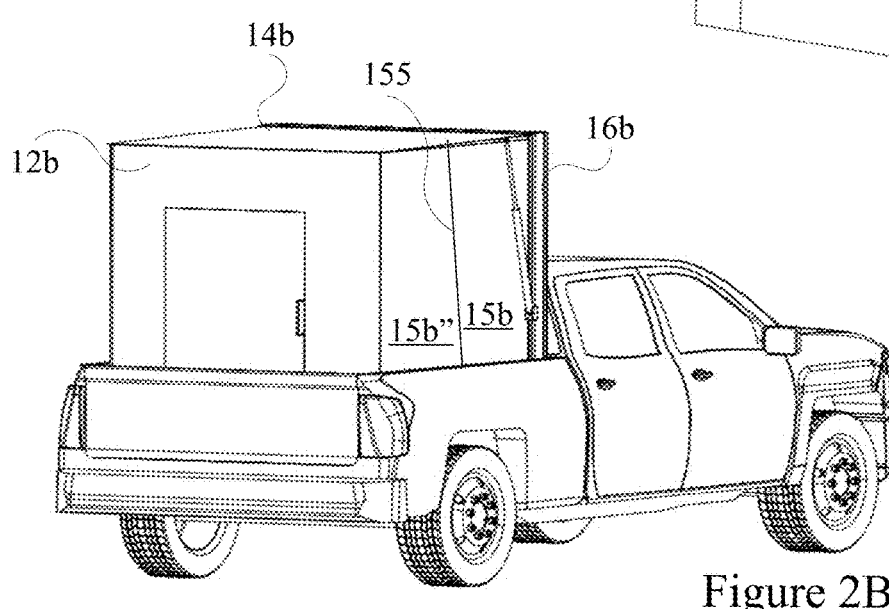

Referring now to FIGS. 2A to 2C, schematically illustrating stages in deploying a foldable storage unit from folded state shown in FIG. 1A, in accordance with an exemplary embodiment of the disclosed subject matter. In the folded state, foldable storage unit 10b appears similar to foldable storage unit 10a seen in FIG. 1A. FIG. 2A (as well as FIG. 2C, which is similar and for simplicity, shown without the truck) schematically shows how extending the unfolding mechanism 17b raises the roof 14b, exposing the back wall 12b that although not connected to it, is stowed adjacent to front wall 16b, between the front wall and the roof.

Each side wall is made of two sections 15b and 15b" that are hingedly connected about hinge 155 (clearly seen in FIG. 2B). Back wall 12b is hinged to left and right sections 15b of side walls and 15b". The left and right sections of the side walls are hinged one to the other while left section 15b" and right section 15b" of the side walls (from both sides of the structure) are hinged to back wall 12b and front all 16b, respectively.

When roof 14b is raised, sections 15b and 15b" can swing, such that back wall 12b moves towards tailgate 7. This may be done by manually pulling back wall 12b or preferably by using an unfolding automatic and optionally controlled mechanism (not seen in these figures).

FIG. 2B schematically shows the foldable storage unit 10b in its fully deployed state.

Optionally, fasteners are provided to lock the side walls 15b and 15b" and/or back wall 12a to stabilize the foldable storage unit 10b and to prevent unauthorized entrance to the foldable storage unit 10b. Optionally, in order to re-fold the foldable storage unit 10b, the above steps are performed in reverse order.

It should be mentioned that the sections that comprises the side walls can also be organized so that the hinge between the two sections is horizontal. Any other order of sections or their number is possible and the examples shown herein, be no means, limit the scope of the subject matter.

Reference is now made to FIG. 2D schematically illustrating a foldable storage unit, in accordance with another exemplary embodiment of the disclosed subject matter. The foldable storage unit 10d is seen deployed and installed in the rear load area of pickup truck 9. The foldable storage unit 10d comprises a back wall 12d with a door 11, optionally having a lock 13; a roof 14d; two side walls made of two sections 15d and 15d" (only one wall assembly is seen in this figure); and a front wall having a frame 16d". Not seen in this figure is the optional unfolding mechanism. However, unfolding mechanism or a group of unfolding mechanisms as shown herein before or known in the art may be used for automated and easy deployment and folding the unit.

Entering the foldable storage unit 10d may require opening the tailgate 7 at the back of pickup truck 9.

Optionally, the side walls sections 15d and 15d" can be connected by a hinge, can slide one on top of the other such as in telescopic mechanism, made of three parts or more, and can have handles 730.

In contrast to the embodiments shown herein before, the roof in the embodiment shown herein comprises of a central section 14d and two folding roof sections 14d". In contrast to the embodiment seen herein before, the back wall comprises of a central section 12d and two folding back wall sections 12d". Back wall central section 12d is connected to roof central section 14d by hinges 830. Similar or identical hinged are used to connect other folding sections of the foldable storage unit 10d such as the hinges that connect the sections and the door to the back wall.

Regarding the embodiment discussed in FIGS. 2A-2D, it should be noted that each of the side walls of the storage units comprises a front side section and a back side section, wherein the front side section is hinged to front wall on its corresponding vertical edge, and to a vertical edge of the back side section while the opposite vertical edge of the back side section is hinged to a corresponding edge of the back wall.

Referring now to FIGS. 3A to 3D schematically illustrating steps in a method of deploying the foldable storage unit from folded state, in accordance with some exemplary embodiments of the disclosed subject matter.

For simplifying the drawings, the parts of the pickup truck were omitted.

Figure 3A:
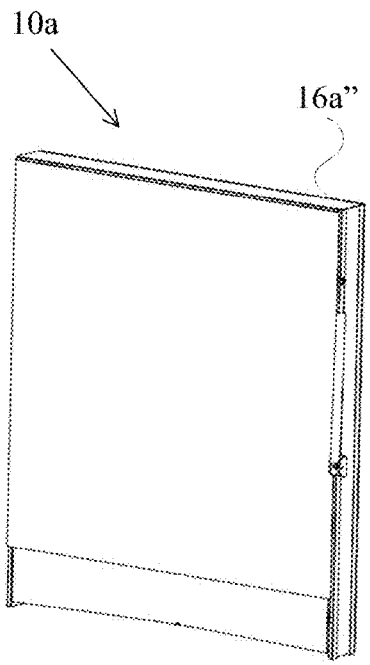
FIGS. 3A to 3D schematically illustrate steps of a method of unfolding a foldable storage unit, in accordance with another exemplary embodiment of the disclosed subject matter.
Figure 3B:
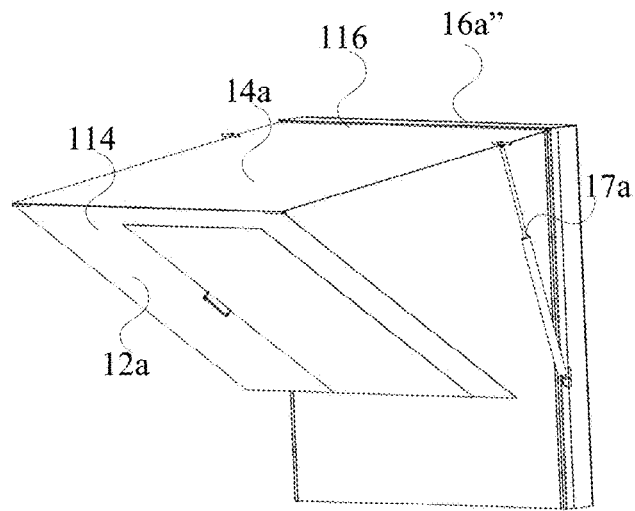

FIG. 3A schematically shows that the foldable storage unit 10a is folded adjacent to and preferably within a frame 16a" of the front wall 16a.

Unfolding mechanism 17a is connected between the roof 14a and the front wall 16a or its frame 16a". Unfolding mechanism 17a can be of any system that is capable of enforcing movements of items such as hydraulic piston, an electrical motorized actuator, a manual jack type mechanism, a combination thereof or the like, providing sufficient force to lift the roof 14a and the back wall 12a that is attached to the distal edge 114 of roof 14a. Optionally, two unfolding mechanisms are used, one at each side of the back wall 16a.

Seen below roof 14a (in FIG. 3C) is at least one side wall 15a that is still adjacent to the front wall 16a. In the folded state, roof 14a is hinged to the proximal edge 116 of front wall 16a.

From the figures, it can be seen how extending the unfolding mechanism 17a raises the roof 14a, exposing the side wall(s) 15a and back wall 12a. Back wall 12a, hinged on distal edge 114 of roof 14a unfolds by the force of gravity.

Figure 3C:
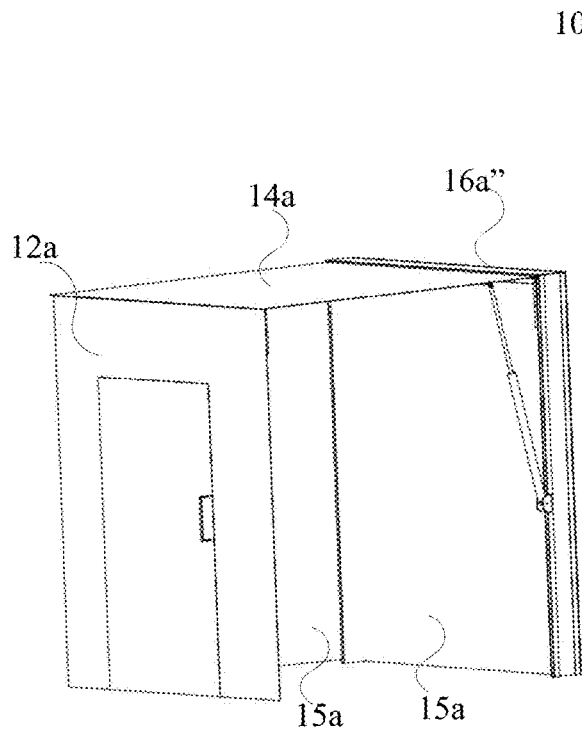

FIG. 3C schematically shows the unfolding mechanism 17a extended such that roof 14a and back wall 12a are in their deployed state. The left side wall 15a, hinged to front wall 16a can now be opened to its deployed state exposing the right side wall 15a, hinged to the corresponding side of front wall 16a.

Figure 3D:
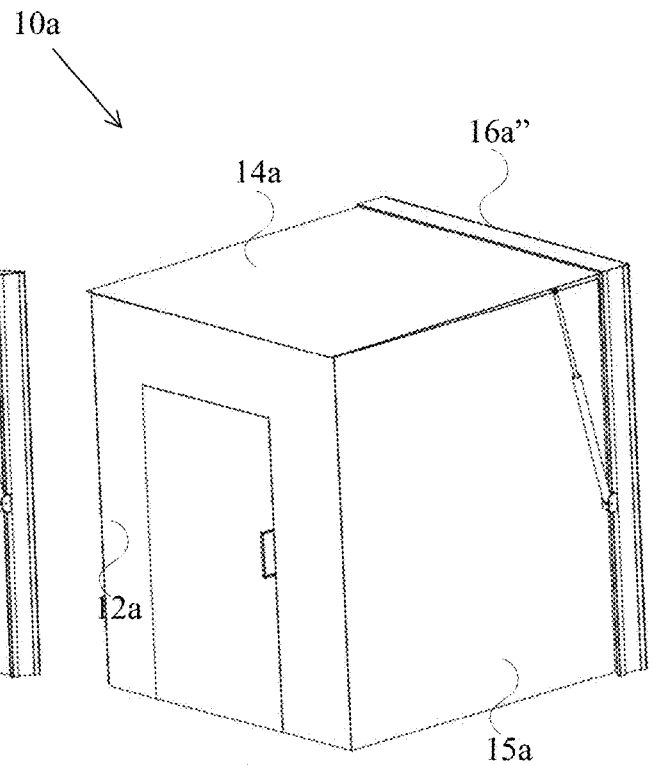

FIG. 3D schematically shows how opening the right side wall 15a completes the unfolding of the foldable storage unit 10a to the deployed state seen in FIG. 1B.

It should be noted that the order of opening the side walls 15a depends on which of the side wall is stowed behind the other. Since the side walls are hinged, opening and closing them may be done manually.

Optionally, fasteners are provided to lock the side walls 15a to the back wall 12a to stabilize the foldable storage unit 10a and to prevent unauthorized entrance to the foldable storage unit 10a.

Optionally, in order to re-fold the foldable storage unit 10a, the above steps are performed in reverse order.

Optionally, re-fold the foldable storage unit 10a, the unfolding mechanism 17a may be further extended, raising roof 14a to be substantially vertical above front wall 16a such that gravity causes back wall 12a to fold against roof 14a. Back wall 12a may then be fastened to roof 14a such that contracting unfolding mechanism 17a folds both roof 14a and back wall 12a together to the folded state seen in FIGS. 3A and 1A.

Alternatively, a back wall folding mechanism (not seen in these figures) is connected between roof 14a and back wall 12a to facilitate folding and optionally unfolding of back wall 12a.

Referring now to FIGS. 4A to 4E schematically illustrate deployment of a foldable storage unit, in accordance with some other exemplary embodiments of the disclosed subject matter.

Two side wall assemblies that comprises bottom portion 15c, middle portion 15c″, and upper section 15c‴, are folded adjacent to the folded roof 14c and swings as a unit so as to be open. As mentioned herein before, each side wall assembly comprises three sections. The sections are arranged to form the side walls as follows: the lower section 15c having an opening 716 to fit over the corresponding back wheel bay 5; a middle section 15c″ that can slide upwardly and downwardly along the lower section 15c; and an upper section 15″″ that is preferably hinged to an upper edge 720 of middle section 15c″ (the hinge is clearly seen in FIG. 4C). It should be clarified that the third upper section 15c‴ of the side wall can also be constructed to slide along both lower sections or just the middle one. Optionally, two side wall assemblies are hinged to the floor or the sides of rear load area 8. Other mechanisms are possible without limiting the scope of the present subject matter.

Figure 4A:
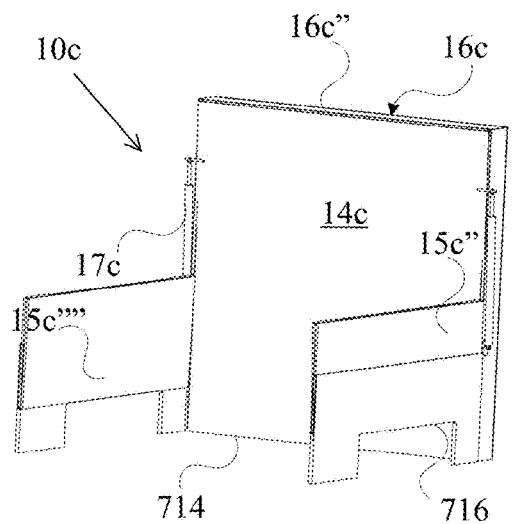
FIGS. 4A to 4E schematically illustrating steps of a method of unfolding a foldable storage unit, in accordance with another exemplary embodiment of the disclosed subject matter.
Figure 4B:
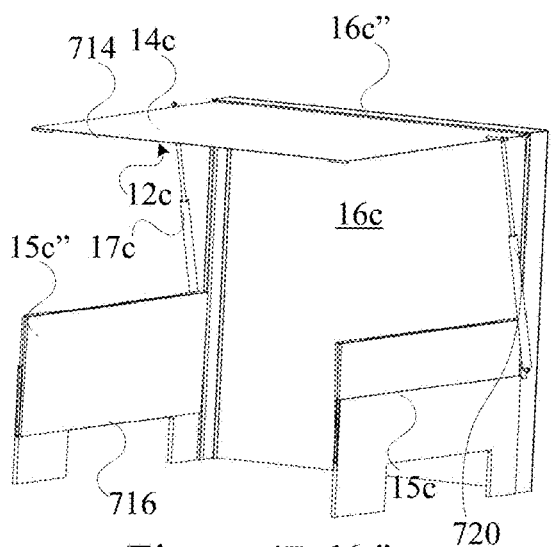

FIG. 4B schematically shows how extending unfolding mechanisms 17c raise roof 14c and front wall 12c that is hinged to the distal edge 714 of roof 14c, and is fastened in a folded state adjacent to the roof 14c and seen in FIG. 4B below the roof.

Figure 4C:
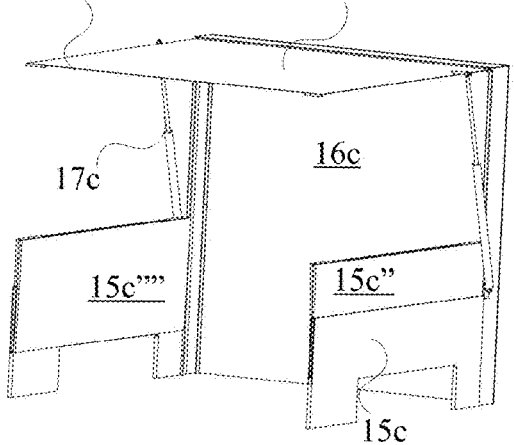
Figure 4D:
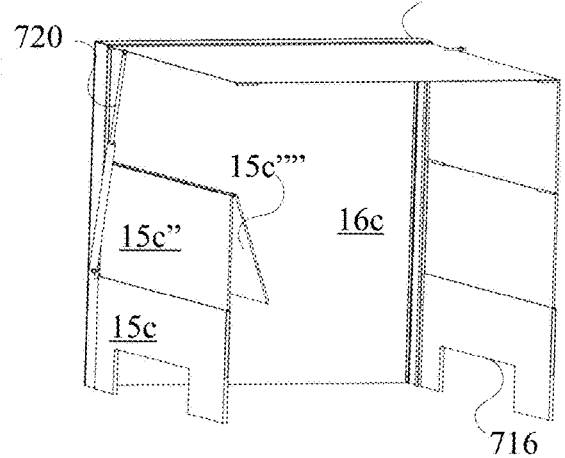

FIGS. 4C and 4D schematically show how the middle section 15c″ of the left side wall assembly, together with the upper section 15c‴, which is hinged to its upper edge 720, slides upwardly along the lower section 15c to its deployed state. Right side wall assembly, made of the sections 15c, 15c″ and 15c‴ is seen in its complete deployed state, while the upper section 15c‴ of left side wall assembly swings about the upper edge 720 of the middle section 15c″ towards its deployed state.

It should be noted that the order of deployment of the left and right side walls sections 15c, 15c″, and 15c‴ can be done manually as the sections are relatively small and light compare to full size roof or walls. Alternatively, unfolding mechanisms may be used for unfolding the left and right side walls.

Figure 4E:
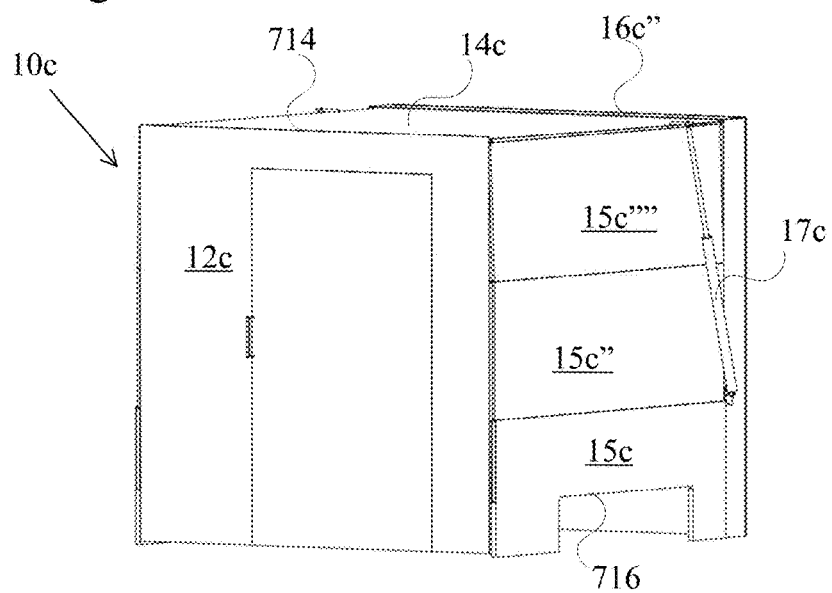

FIG. 4E schematically shows foldable storage unit 10c in its fully deployed state. Back wall 12c is unfastened from roof 14c and swings aided by gravity about edge 714 to its deployed state.

Optionally, fasteners are provided to lock the side walls assembly 15c, 15c″, and 15c‴ and the back wall 12c to stabilize the foldable storage unit 10c and to prevent unauthorized entrance to it.

Optionally, in order to re-fold the foldable storage unit 10c, the above steps are performed in reverse order.

It should be noted that other methods of unfolding a foldable storage unit, in accordance with some another exemplary embodiment of the disclosed subject matter can be performed. In another variation, the back wall is deployed before the side walls are deployed. This variation or any other one does not limit, by no means, the scope of the present subject matter.

It should be noted that in all the methods disclosed above as well as the organization of the walls and wall sections, variations in the order of steps are possible. It should be noted that in all the embodiments disclosed above, variations in the way elements are affixed or hinged to each other are possible. Specifically, any section that is light enough to be manually manipulated may be not hinged to another, but stowed separately and manually positioned and fasten in its deployed state.

Figure 5A:
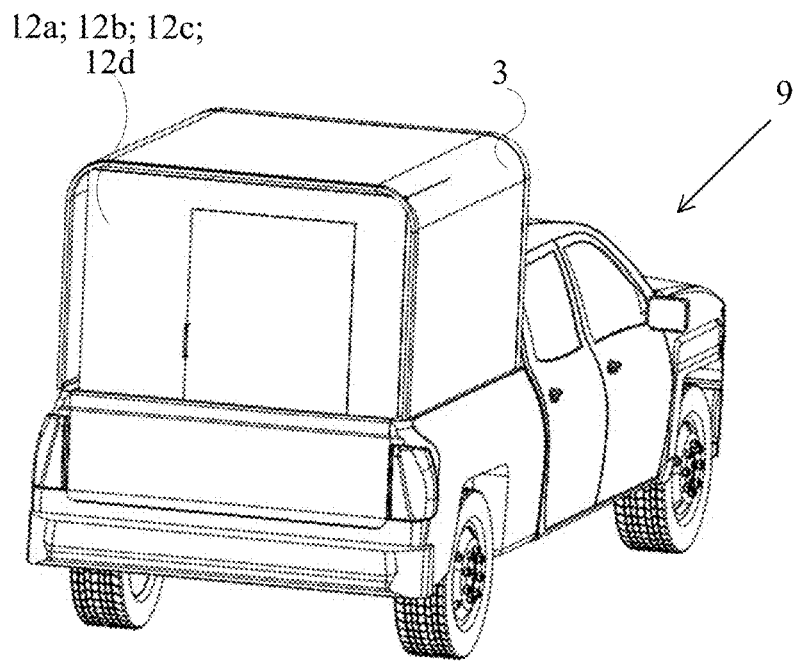
FIG. 5A schematically illustrates a foldable storage unit with a full cover, in its deployed state, in accordance with some another exemplary embodiment of the disclosed subject matter.
Figure 5B:
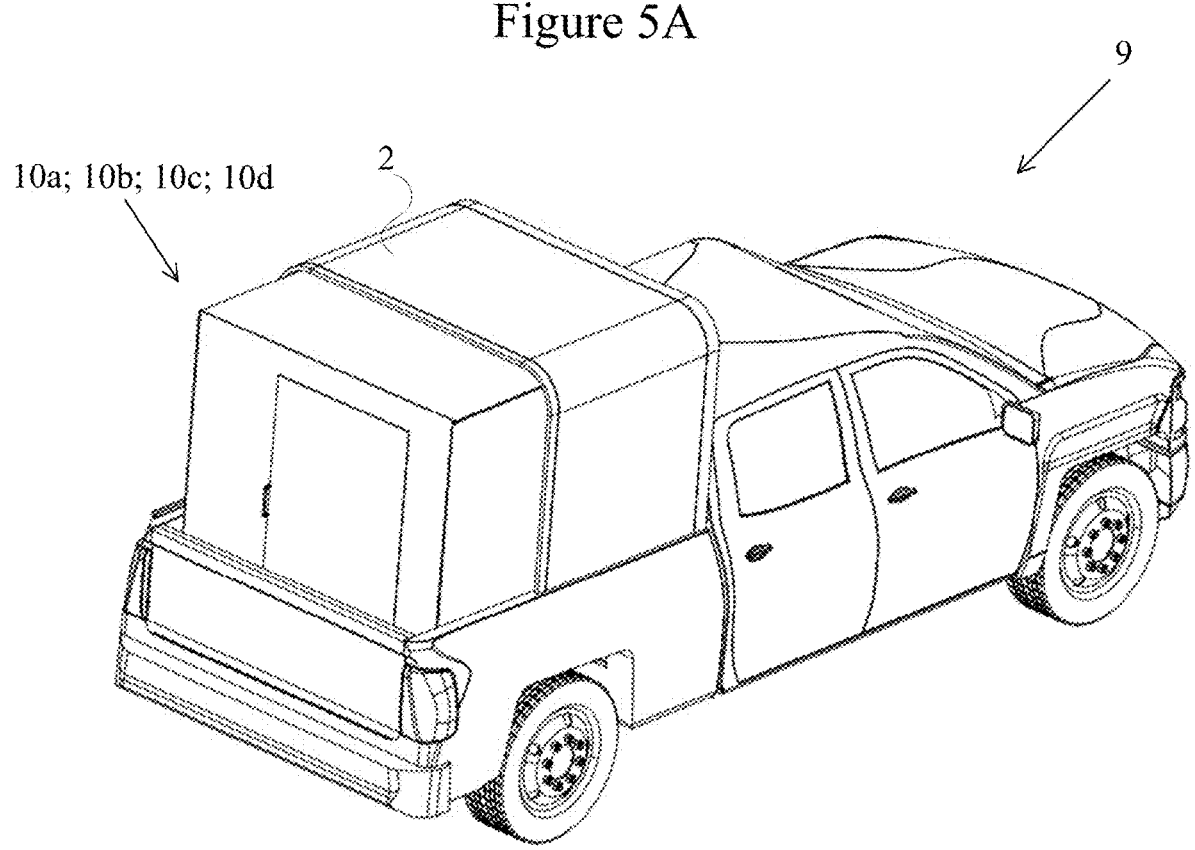
FIG. 5B schematically illustrates a foldable storage unit with a partial cover, in its deployed state, in accordance with some another exemplary embodiment of the disclosed subject matter.

Referring now to FIGS. 5A and 5B, schematically illustrating a foldable storage unit in its deployed state with a full cover over it and a partial cover, respectively, in accordance with some another exemplary embodiment of the disclosed subject matter.

Foldable storage unit 10a, 10b, 10c, or 10d can be covered with a cover 3. In some embodiments, while the foldable storage units 10a, b, c, or d are made from rigid materials such as sheet metal, the cover 3 can be a rigid, semi rigid, or flexible cover. The material is preferably a water proof material. When the cover is rigid or semi rigid, the foldable storage unit can be folded and unfolded while the cover is already in place. The cover 3 is sized such that some gap is formed between the cover and the foldable storage unit to facilitate folding and deploying the foldable storage unit. In these cases, the methods of folding and deploying foldable storage unit are adapted as to avoid collision of elements of the foldable storage unit with the cover during folding and deploying process.

As shown in FIG. 5B, the cover can be a partial cover. Foldable storage unit 10a, 10b, or 10c can be covered with a partial cover 2. In some embodiments, the partial cover 2 is a rigid or semi rigid and a foldable storage unit 10a, 10b, 10c or 10d can be folded and deployed while the cover is in place. The cover 2 can be also flexible so that it can be organized to cover a desired size of the foldable storage unit.

Figure 6A:
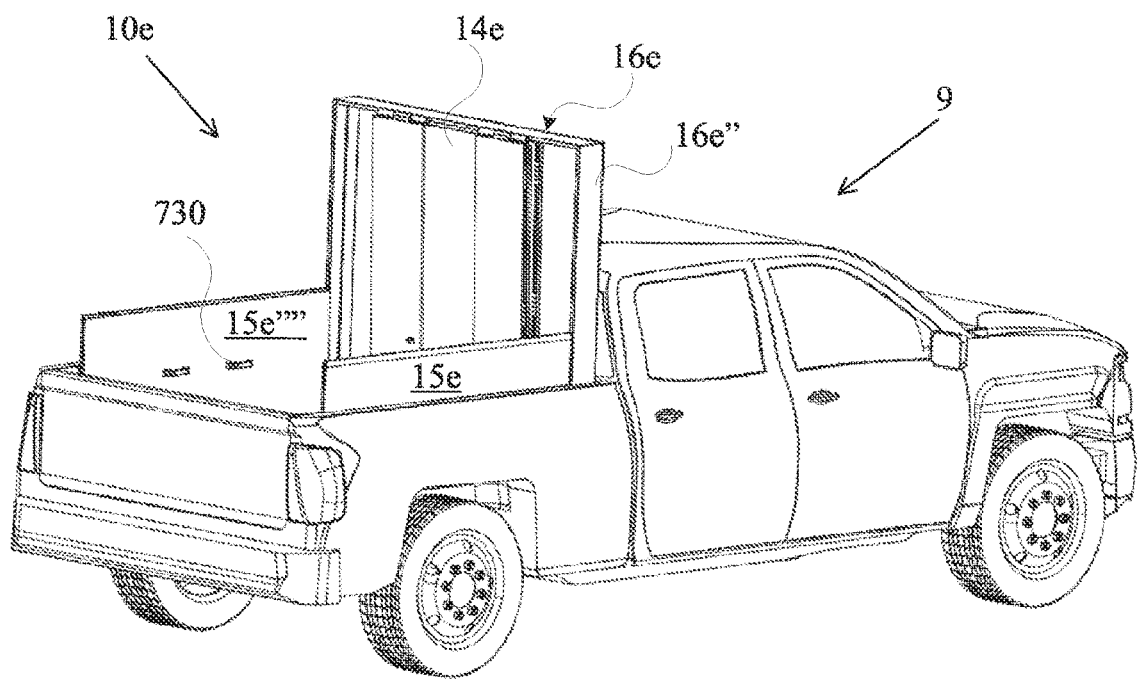
FIGS. 6A to 6M schematically illustrate the steps of deploying a foldable storage unit, in accordance with some exemplary embodiments of the disclosed subject matter.

Referring now to FIGS. 6A to 6M schematically illustrating the steps of unfolding the foldable storage unit 10e, in accordance with some exemplary embodiments of the disclosed subject matter. FIG. 6A schematically shows the foldable storage unit 10e in folded state, on pickup truck 9, in accordance with some exemplary embodiments of the disclosed subject matter.

In this state, the upper sections 15e‴ of the side walls are folded inwardly against the middle sections 15e″ (cannot be seen in this figure). The middle sections 15e″ together with the upper section 15e‴ of the side wall can slide upwardly along the lower section 15e. Handles 730 are facilitating manually deploying the side walls.

In this state, the two foldable roof sections (will be seen herein after) of roof 14e are folded against the central section of roof 14e. The back wall is folded such that it is between roof central section 14e and front wall 16e, and thus cannot not be seen in this figure.

Figure 6B:
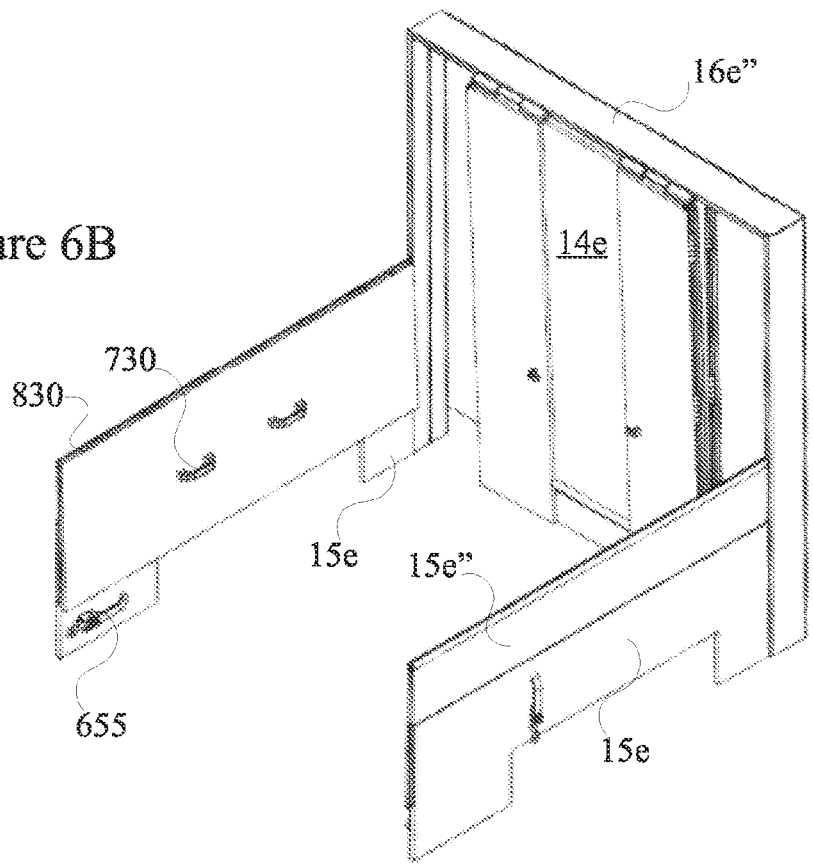

Referring now to FIG. 6B schematically showing an isometric view of the foldable storage unit 10e partially deployed, without the pickup truck for better visualization. Seen also in this figure is the optional quick release fastener 655 for connecting the back wall to the lower section 15e of the side wall, to stabilize the foldable storage unit 10e in its deployed state.

Figure 6C:
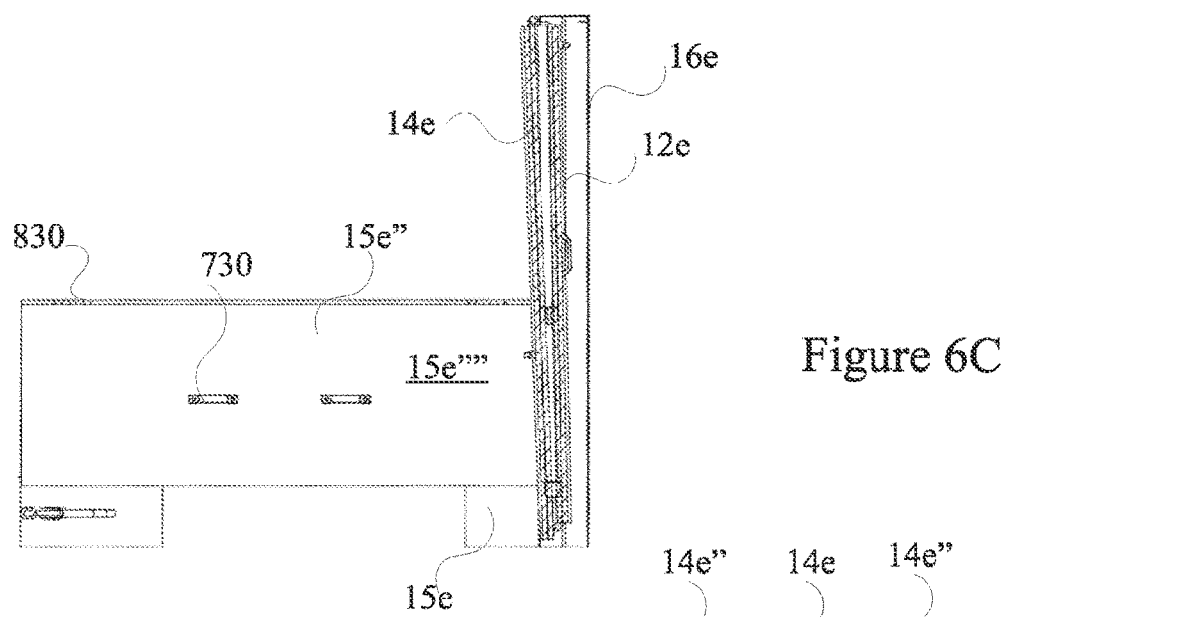

Referring now to FIG. 6C, schematically showing a cross-sectional side view of the foldable storage unit 10e partially deployed. In this cross-sectional view, the relative positions of front wall 16e, roof 14e and back wall 12e that can be seen between the roof and the front wall.

Figure 6D:
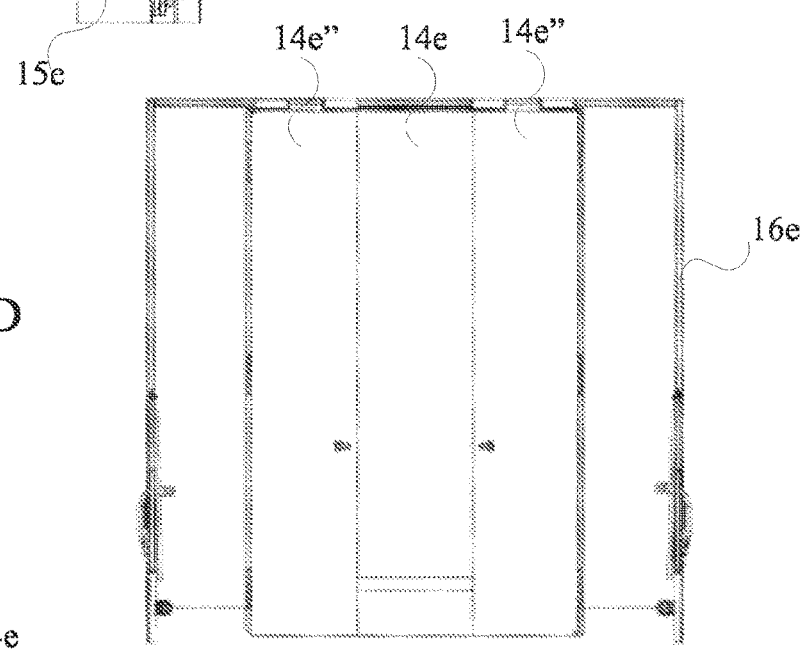

Referring now to FIG. 6D schematically showing a rear view of the foldable storage unit 10e partially deployed.

Figure 6E:
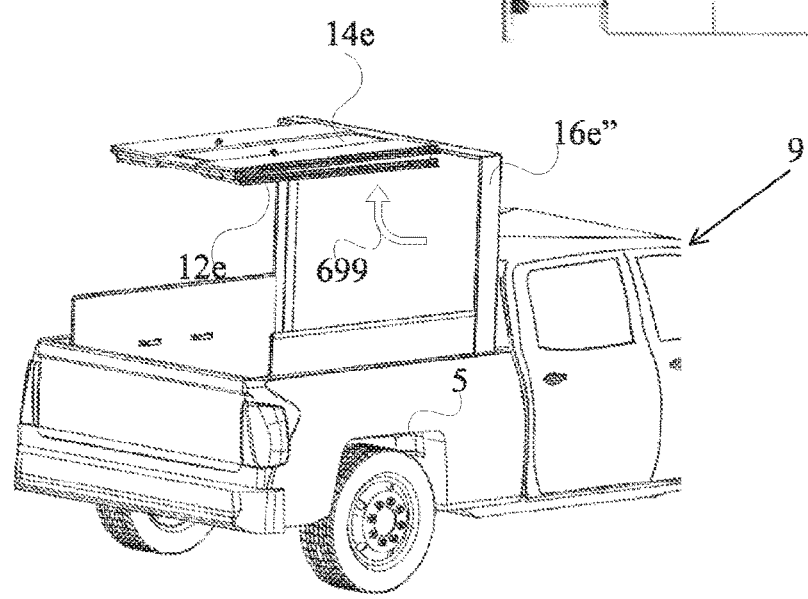

Referring now to FIG. 6E schematically showing a first step in unfolding the foldable storage unit 10e, in accordance with some exemplary embodiments of the disclosed subject matter. Roof 14e, together with back wall 12e that is adjacent to the roof are rotated about hinges (not seen in this figure) on the distal edge of front wall 16e from within the frame 16e‴. Both roof 14e and back wall 12e are having their sections folded. This allows both roof 12e and back wall 12e to rotate in the direction shown by arrow 699 without colliding with the back wheel bays 5. Due to the weight of combined roof 12e and back wall 12e, rotation according to arrow 699 may be performed using unfolding mechanism or mechanism as discussed above with connection to the previous embodiments.

Figure 6F:
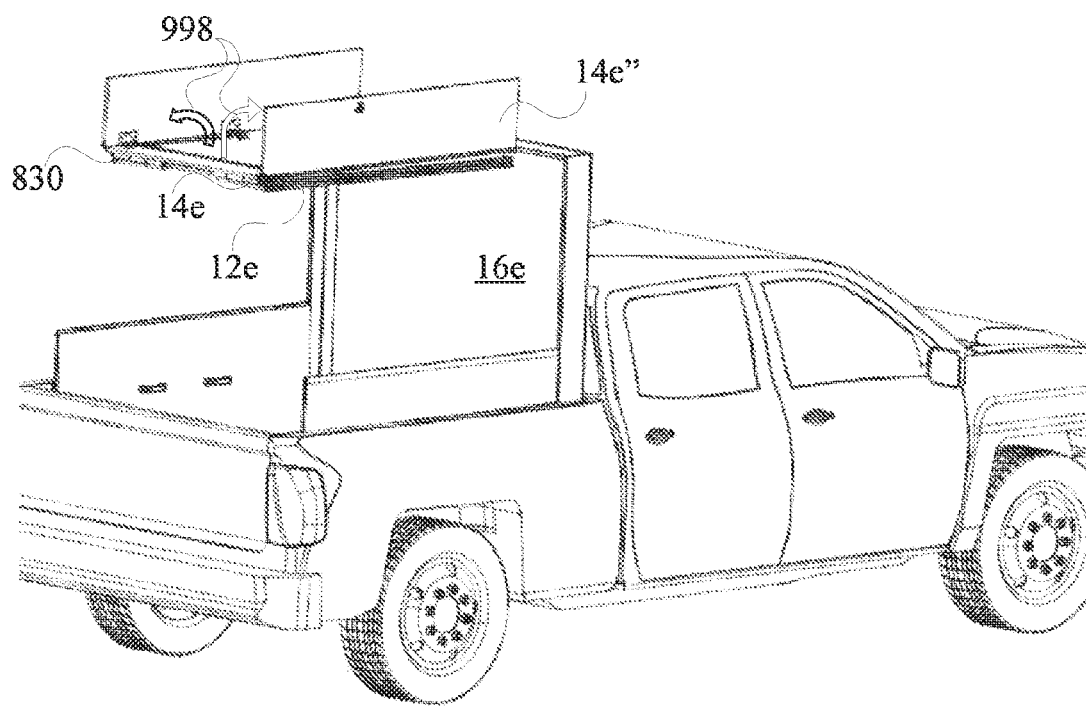

Referring now to FIG. 6F schematically showing further deployment of the foldable storage unit 10e. The two folding roof sections 14e" rotate in the direction indicated by arrows 998 outwardly about hinges 830 so that they are laid aside central section of the roof 14e and not on it.

Figure 6G:
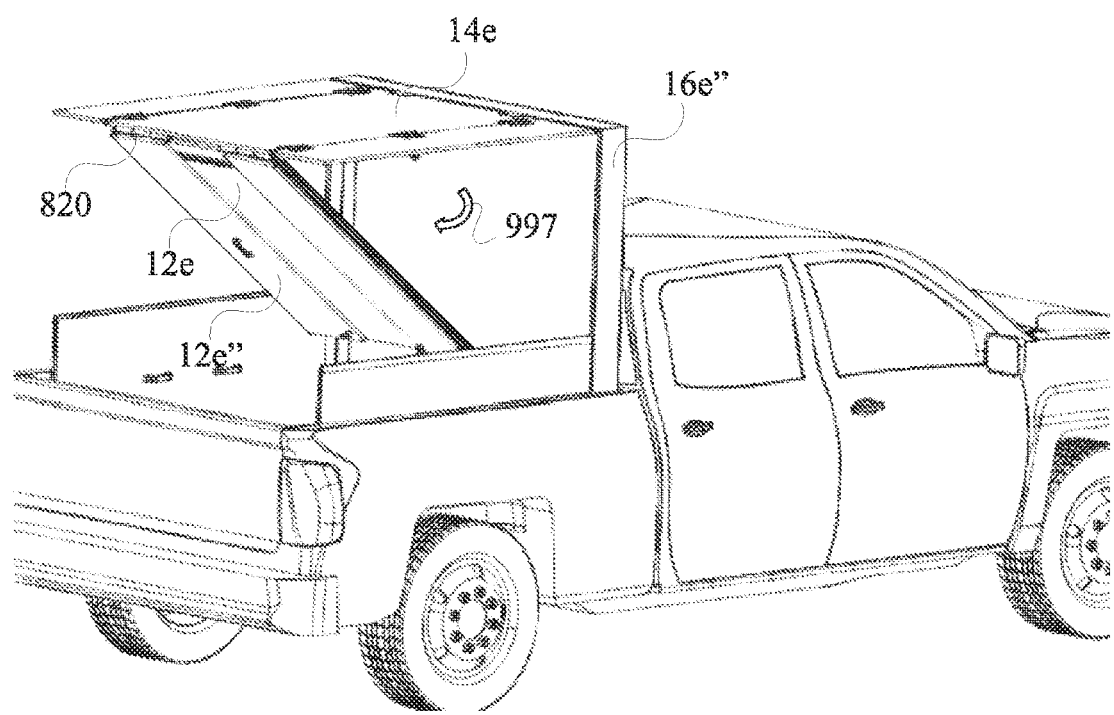

Referring now to FIG. 6G schematically showing an isometric side view of the deployment of the foldable storage unit 10e. The folded back wall central section 12e and both adjacent and folded side sections 12e" rotate according to arrow 997 outwardly about hinges 820. Hinges 820 may have a locking mechanism to keep back wall 12e folded against roof 14e and to allow controlled deployment of the back wall 12e.

Due to the weight of back wall 12e, rotation in the direction indicated by arrow 997 may be performed using unfolding mechanism or mechanism as discussed above with connection to the previous embodiments. Alternatively, the rotation of the back wall 12e may be performed using gravity or manually.

Figure 6H:
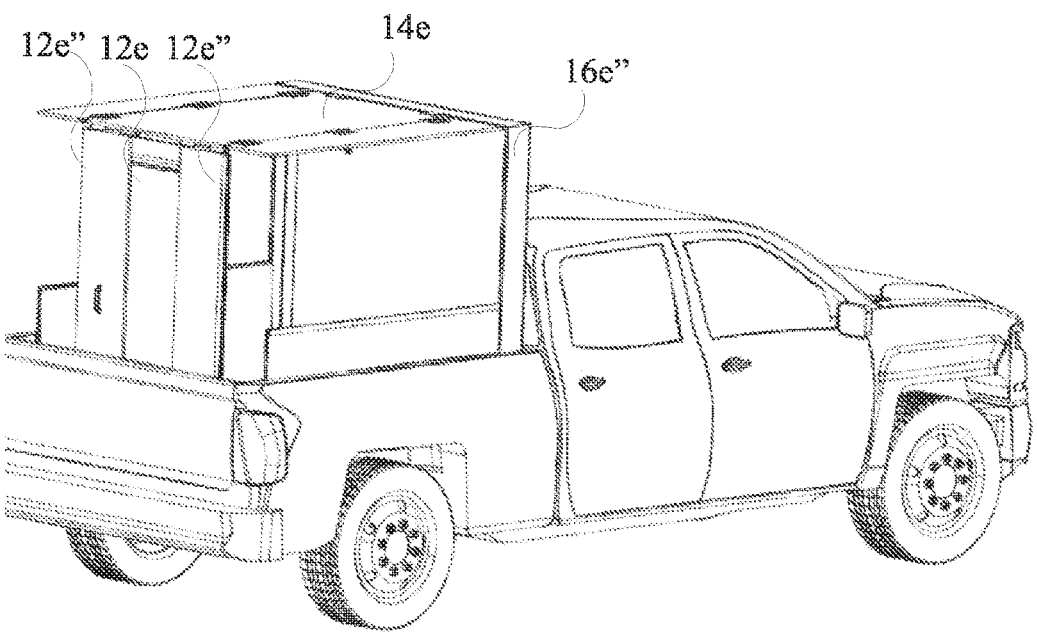

Referring now to FIG. 6H schematically showing an isometric side view of further deployment of the foldable storage unit 10e. In this state, central section 12e" of the back wall and the central section of the back wall 12e is in its final state while the two side sections of the back wall 12e" are folded against it.

Figure 6I:
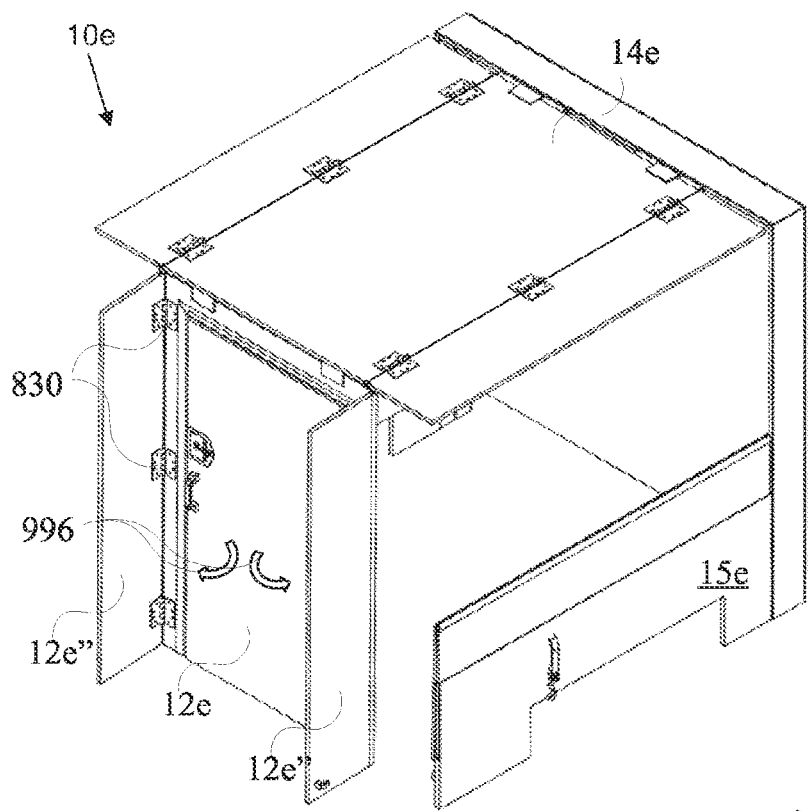

Referring now to FIG. 6I schematically showing an isometric side view of further deployment of the foldable storage unit 10e. In this step, the two side sections of back wall 12e" are unfolded according to arrows 996 about hinges 830. Unfolding of the two side sections of the back wall 12e" can require opening the tailgate 7 (seen in other figures). Alternatively, two side sections of the back wall 12e" are situated inwardly to central section 12e so that they are not colliding into the tailgate. In any case, this also depend on the length of the side walls and whether the length exceeds to the tailgate or the volume of the storage unit is lower.

Figure 6J:
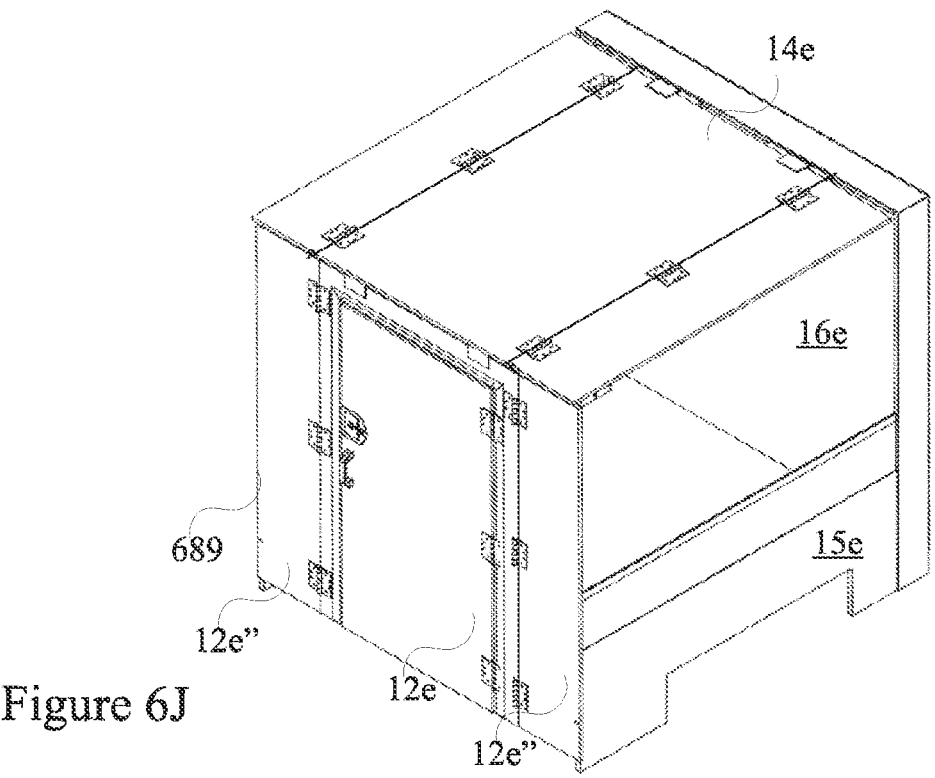

Referring now to FIG. 6J schematically showing an isometric side view of even further deployment of the foldable storage unit 10e. In this state, the back wall 12e is in its deployed state while both foldable sections 12e" are aside the central section. Optionally, the two side sections 12e" of the back wall are secured to the lower sections 15e of the side walls with quick release fastener 689 (as also disclosed herein before).

Figure 6K:
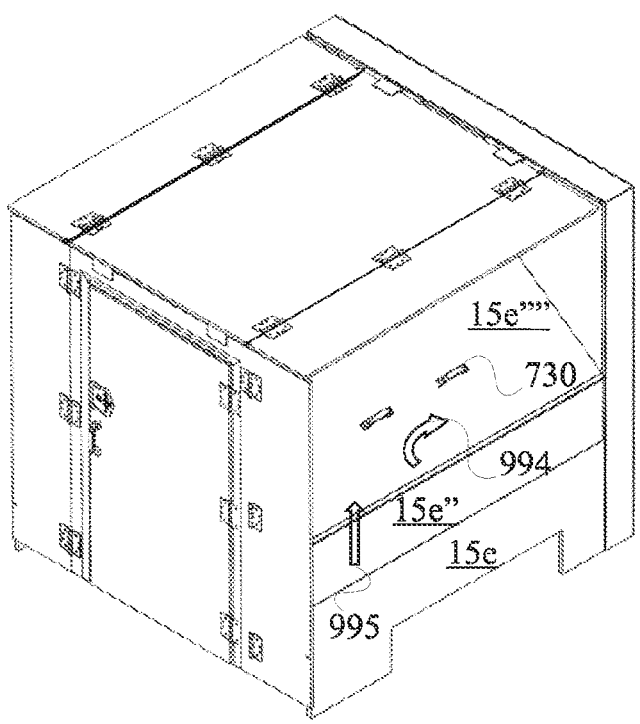

Referring now to FIG. 6K schematically showing an isometric side view of the deployment of the foldable storage unit 10e. Using handles 730, the upper section of the side wall 15e"", together with the middle section 15e" of the side wall are pulled up in a direction shown by arrow 995 along the lower section of the side wall 15e. The upper section of the side wall 15e"" is rotated outwardly in the direction shown by arrow 994 about hinges 830 (seen in previous figures).

Figure 6L:
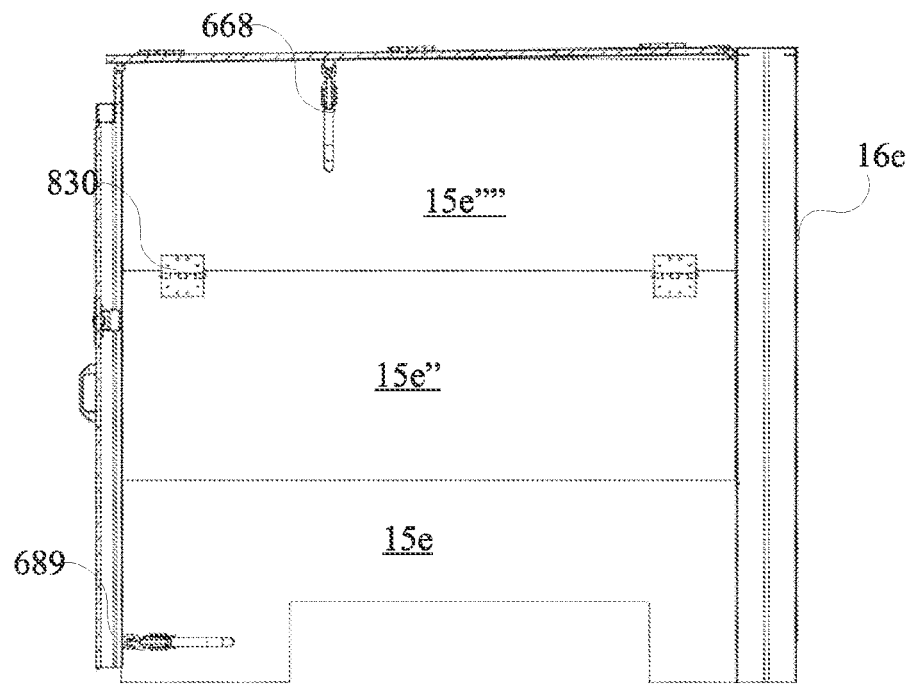

Referring now to FIG. 6L schematically showing a side cut-out view of the deployment of the foldable storage unit 10e. Upper sections of side walls 15e"" are secured to the folding sections of the roof 14e" with quick release fastener 668 to complete the deployment process and bring the foldable storage unit 10e to its deployed state.

Folding the foldable storage unit 10e requires performing the above steps in reverse order. It should be noted that the order of steps may be different, and few steps may be performed concurrently.

Figure 6M:
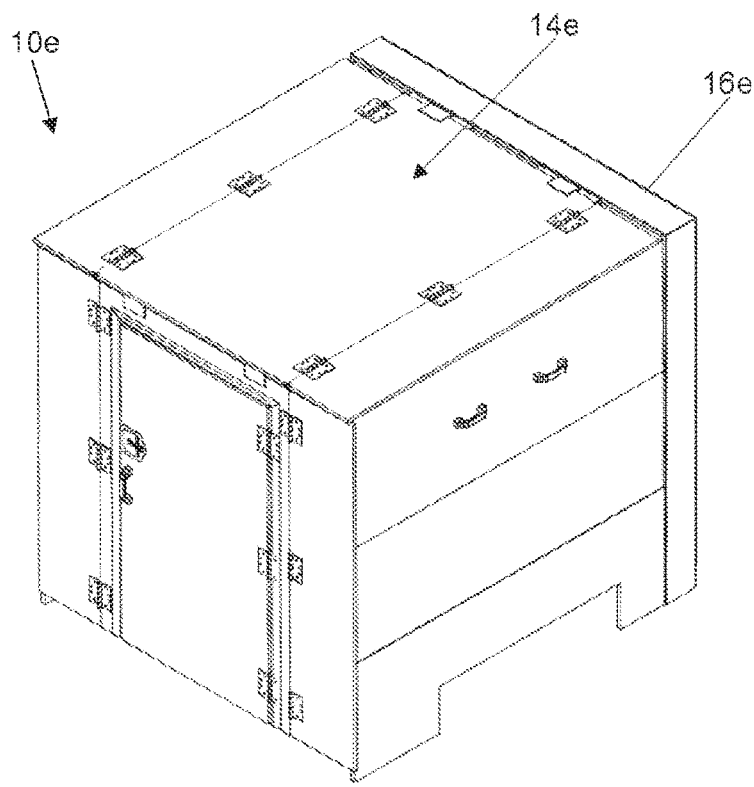

Referring now to FIG. 6M schematically showing the foldable storage unit in fully deployed state, without the pickup truck for better visualization, in accordance with some exemplary embodiments of the disclosed subject matter.

Generally, the expendable storage units that were depicted in the embodiments shown herein as examples and are configured to be deployed on a surface of a vehicle or a platform comprises a front wall and a back wall that is positioned adjacent to the front wall when in a folded state. The back wall is configured to be deployed opposite the front wall, wherein the back wall has an opening configured to be covered. The storage unit further comprises extendable side walls, each of the side walls is made of at least one section and positioned adjacent to the front wall in a folded state. The side walls are extended between the front wall and the back wall in the deployed state. A roof is also provided that is positioned adjacent to the front wall in a folded state and extended to enclose a volume formed between the front wall, the back wall and the side walls.

In the folded state, the extendable storage unit occupies minimal area of the surface or the platform and transforming the storage unit from folded state to deployed state and vice versa can be handled manually or automatically.

Figure 7A:
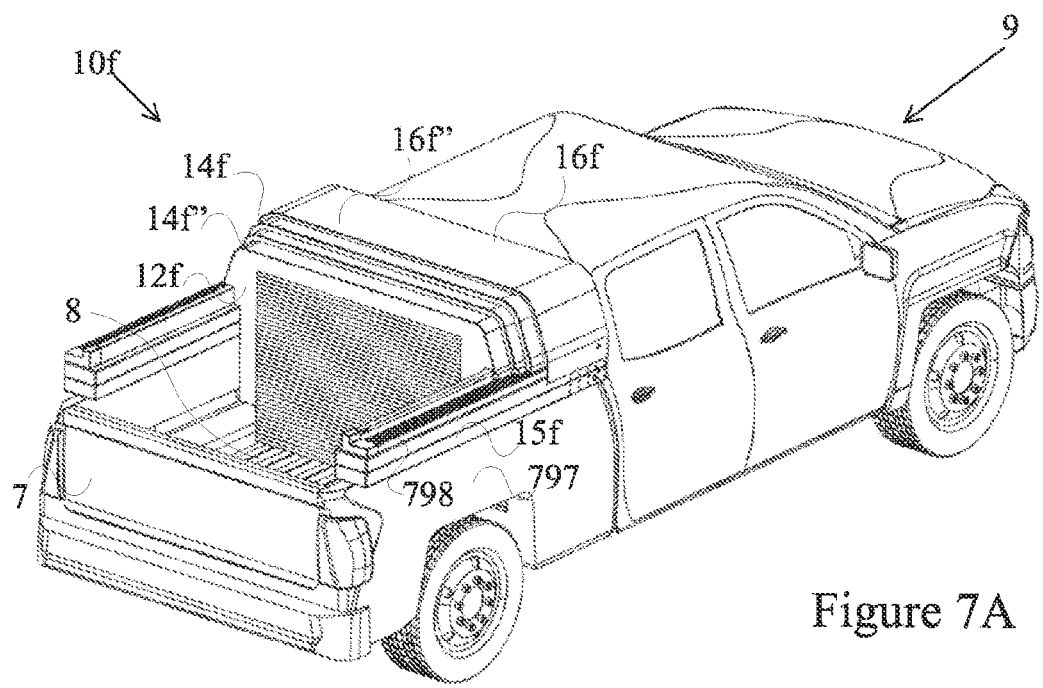
FIG. 7A schematically illustrates a pickup truck with a sliding foldable storage unit in congregated state, mounted on a pickup truck, in accordance with some exemplary embodiments of the disclosed subject matter.
Figure 7C:
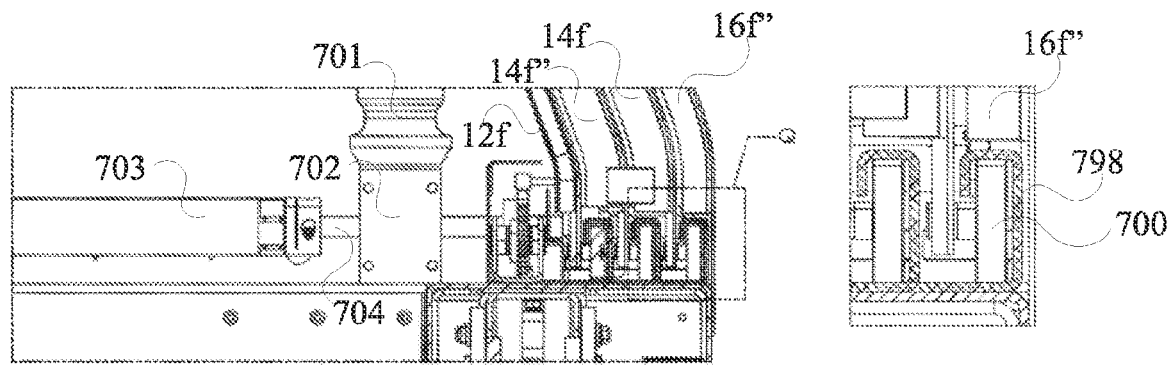
FIG. 7C schematically illustrates a cross sectional view of a segment of the sliding zone in which the sliding section slide and an enlargement portion for additional details.
Figure 7B:
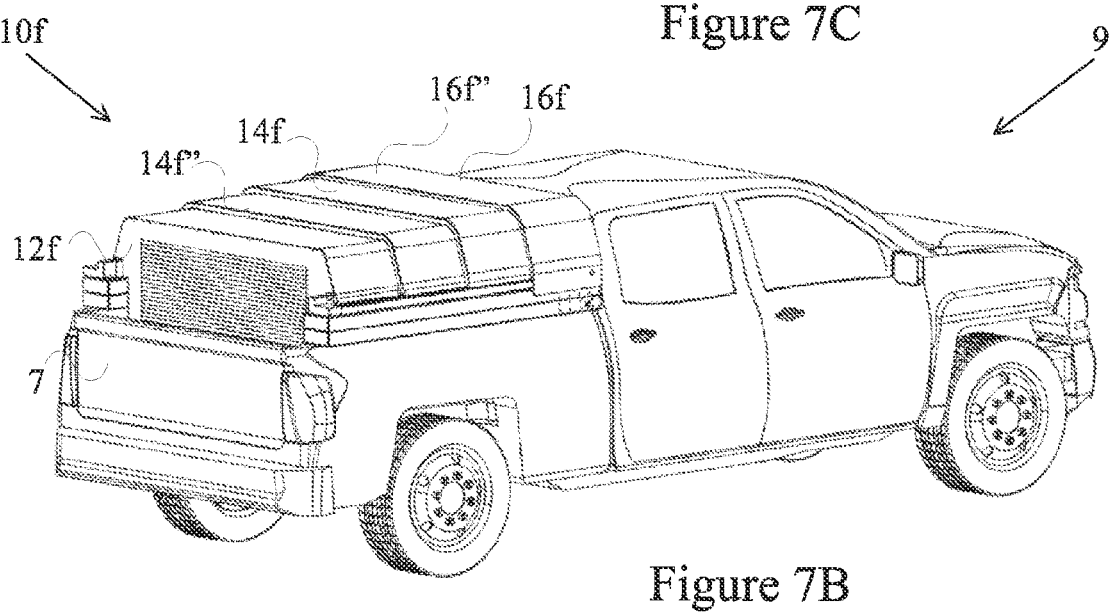
FIG. 7B schematically illustrates the pickup truck with a sliding foldable storage unit shown in FIG. 7A in fully extended state.

Referring now to FIGS. 7A and 7B schematically illustrating a pickup truck with a sliding foldable storage unit in congregated state (FIG. 7A) and in fully extended state (FIG. 7B), mounted on a pickup truck, in accordance with some exemplary embodiments of the disclosed subject matter. Sliding foldable storage unit 10f comprises a front wall section 16f that can be affixed to the truck in a permanent or temporary manner wherein the front wall is preferably connected to a frame 16f''' configured to accommodate a plurality of sliding central sections. In the embodiment shown in FIGS. 7A and B, two such sliding central sections 14f' and 14f'' are seen. It should be noted that the number of the central sections may be larger than, or less than two, and even a single central section is possible without limiting the scope of the present subject matter. A sliding back wall 12f is positioned opposite to the front wall 16f. The front wall frame 16f''', the sliding central sections 14f'' and 14f''', and the sliding back wall 12f are shaped as arches that form a roof and side walls.

In FIG. 7B, it can be seen that the central sliding sections 14f' and 14f'' are pulled from the congregated state over the rear load area 8 of the pickup truck 9 while the sliding back section 12f is slid to be adjacent to the tailgate 7. In this extended state, there is a close volume that is enclosed between the back and front walls, the surface of the rear load area and the arched sliding sections that are now extended.

The sides of the arches shaped front wall and the adjacent frame, the sliding sections, and the back wall are mounted on rails 798 that are provided on the side frame 797 of the rear load area of the pickup truck 9. The front wall 16f and the frame 16f''' are connected to the side frame 797 of the rear load area in a firm connection, for example with a plurality of screws. The other portions are sliding on rails 798. The rail can be a broad metal or plastic elongated surface onto which the sections are sliding. Alternatively, the rail can be made of several rail portions, each section can slide on a corresponding portion. Other types of rails or rail-like structures can be employed.

Optionally, the rails 798 are mounted on a side platform 15f that is provided with height adjustment mechanism that will be explained in details herein after.

The arch shape sections are made of rigid material and can act as an adjustable storage unit that can be adjusted as for the volume within the closed structure. The arches and other parts of the structure can be made of any material such as light metal, plastic material, composite or any other. Moreover, the material can be rain proof or not, ventilated, chemically protected, etc. Optionally, the material can be transparent, semitransparent, and any combination thereof or the like.

Reference is now made to FIG. 7C schematically illustrating a cross sectional view of a segment of the sliding zone in which the sliding section slide and an enlargement portion for additional details. Rails 798 are configured to allow a wheel 700 (can be seen in the enlargement Q of the figure) to drive along the rail and along the length of the rear load area of the pickup truck 9. The wheels 700 are connected and drive the lower end of the sliding sections 14f and 14f" as well as the lower end of the sliding back wall 12f along the truck. An electric motor 701 is optionally provided to a gear box 702 that is provided with an axle 704 connected to a hollow shaft 703 so as to allow an automatic operation of the extension process of the sliding storage unit 10f.

It should be mentioned that the storage unit has an adjustable volume that can be achieved by extending the sliding sections to a desired length, while not fully extended. The back wall 12f can be pulled to any extent between the fully congregated state and the fully extended one. FIG. 9B illustrates such an intermediate state, as will be explained herein after.

A shutter 799 is provided in an opening provided in the sliding back wall 12f. the shutter can be a roll-down shutter as illustrated in the figures, a door with a hinge, cover, a combination thereof and the like.

Generally, the front wall of the extendable storage unit and the side walls are stationary relative to the surface of the platform of the truck. The roof is made of a plurality of sliding sections, each of the plurality of sliding sections comprises two opposite edges that slide on corresponding portions of the side walls, and the plurality of sliding sections are capable of sliding one on top of the other so that in a folded state, the plurality of sections is adjacent the front wall and when deployed, the sections are extended away from the front wall.

Referring now to FIG. 8A schematically illustrating a pickup truck with height adjustment mechanism within a side platform having a portion cut-off so as to observe the interior, in accordance with some exemplary embodiments of the disclosed subject matter. The sides frame 797 of the rear load area 8 of the pickup truck 9 are provided with side platforms 15g that are preferably mounted on three sides of the rear load area. This can form an elevated storage volume. The platform 15g comprises a height adjustment mechanism 840 that is accommodated within a housing that comprises a squeeze box shaped envelope 841 that is adapted to extend when the height adjustment mechanism is raised. The squeeze box or accordion shaped envelope 841 is preferably made of a metal sheet that is semi rigid. Other appropriate materials can be used as well, without limiting the scope of the present subject matter.

The height adjustment mechanism 840 can be automated using an engine 860 that preferably should be an electrical motor, however, can be operated by any other means known in the art for activating mechanisms.

Any type of height adjustment mechanism can be used for the purpose of elevating the side walls that are mounted on the sides of the rear load area.

Reference is now made to FIG. 8A(i) schematically illustrates a side view of a height adjustment mechanism, in accordance with some exemplary embodiments of the disclosed subject matter. A preferred elevation mechanism can be a scissors type mechanism, which is a jack that can be operated manually, electrically, hydraulically, or pneumatically, a combination thereof and the like. FIG. 8A(i) illustrates the inner portions of the height adjustment mechanism 840. Two pairs of rods 844 and 844' are diagonally arranged between two bars 848, wherein each pair of rods 844 and 844' is attached by a hinge 846 that allows the rods to rotate about the hinge in scissors mechanism.

One end of each rod 852 of the pair of rods 844 and 844' is slidably connected to opposite rails 850 that are adjacently connected to the bars 848 while facing each other. The end of the rod 852 can slide within the rail 850 so when the rods 844 and 844' are extended from one another while sliding within the rails 850, the bars 848 are separated from one another and the height of the height adjustment mechanism 840 is increased, thereby the side wall 15g (of FIG. 8A) is also increased by height. The height of the elevation mechanism within the height adjustment mechanism 840 is determined by the length of the rods as well as the length of the rails, two parameters that can be changed.

Reference is now made to FIG. 8B schematically illustrating a pickup truck with double height adjustment mechanism having a portion cut-off so as to observe the interior, in accordance with some exemplary embodiments of the disclosed subject matter.

As shown also in the previous embodiment, elevation platform 15g can be mounted on the sides of the rear load area 8 of the pickup truck so as to have an adjustment height of the sides. In this embodiment, it is seen that two platforms 15h and 15h" are mounted on the sides of the rear lead area and one on top of the other. The height of the sides can be altered by mounting several platforms onto the sides of the rear load area. In the cut-off shown in the figure, one can observe a different type of height adjustment mechanism— in this case, hydraulic cylinders 870, which are telescopically elevated, are provided and housed within the accordion-like structure that can be adjusted in its height according to the needs of the user. The hydraulic cylinders 870 can be controlled using an engine 860 that activated both of one of the height adjustment mechanisms.

It should be mentioned that each platform can be provided with the same height adjustment mechanism or with different mechanisms. Other mechanisms can be employed as well, a combination thereof or the like.

Generally, an extendable rigid storage unit is disclosed to be deployed on a pickup truck having a cabin and a rear load area having sides and tailgate, the extendable storage unit comprises a stationary front wall having a length that is slightly shorter than a length between the sides of the rear load area. The front wall is on the rear load area and can be adjacent and connected to the cabin or the tailgate. Side walls are mounted on the sides of the rear load area while each of the rails is mounted on a corresponding side wall.

The expendable unit also comprises a sliding back wall positioned opposite the front wall and capable of sliding on the two rails. The sliding section or sections are disposed between the stationary front wall and the sliding back wall, wherein the sliding sections are capable of sliding on the two rails wherein in a folded state, the at least one sliding section and the back wall are adjacent to the front wall and in a fully deployed state or partially deployed state, the at least one sliding section is positioned aside the sliding back wall to form an enclosed volume. In the folded state, the extendable storage unit occupies minimal area of the rear load area and in the deployed state or the partially deployed state, the sliding back wall is configured to extend away from the front wall while when the back wall reaches the tailgate or the cabin, respectively, the extendable storage unit occupies a maximal area while the back wall can be fixed in any distance on the rear load area from the front wall.

Figure 9A:
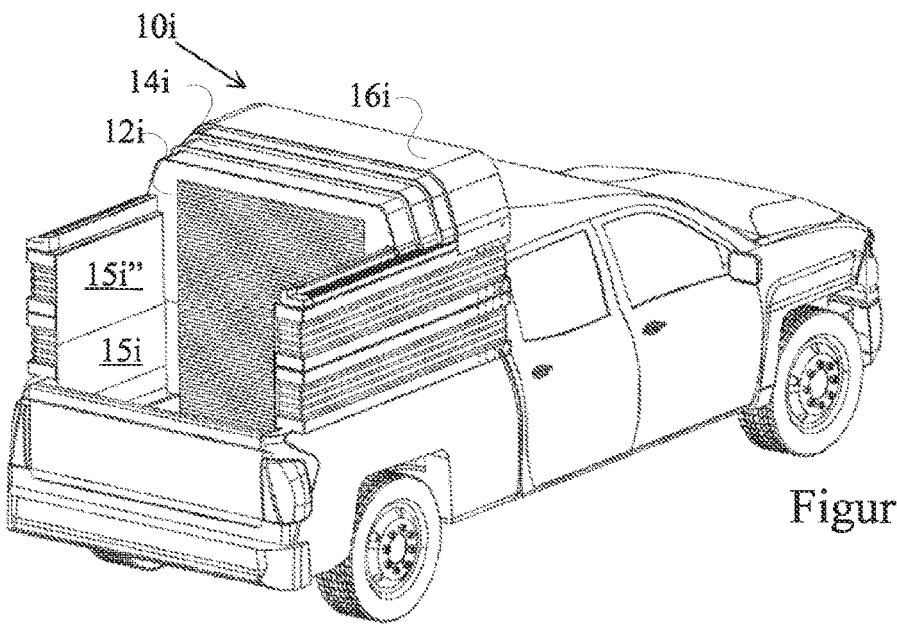
FIGS. 9A to 9C schematically illustrate the sliding foldable storage unit three different states, in accordance with some exemplary embodiments of the disclosed subject matter.
Figure 9B:
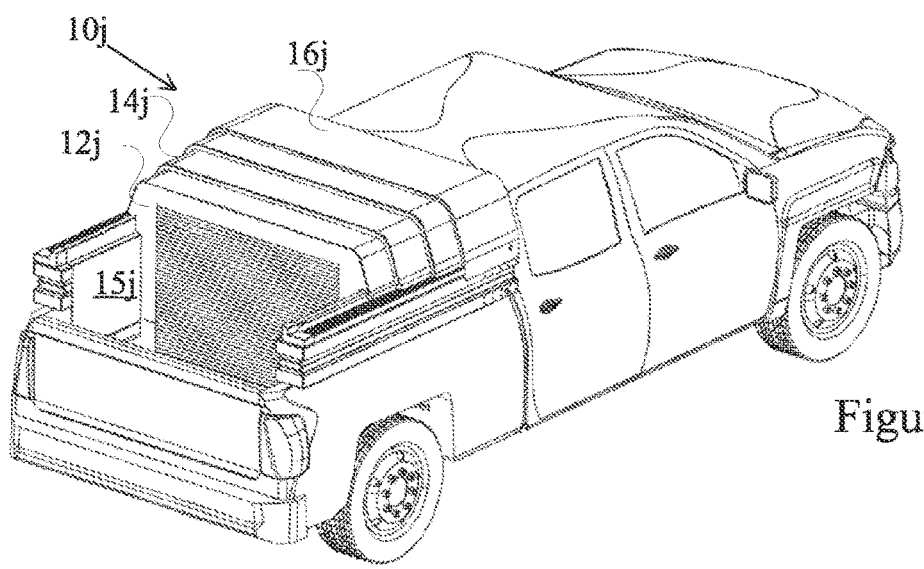
Figure 9C:
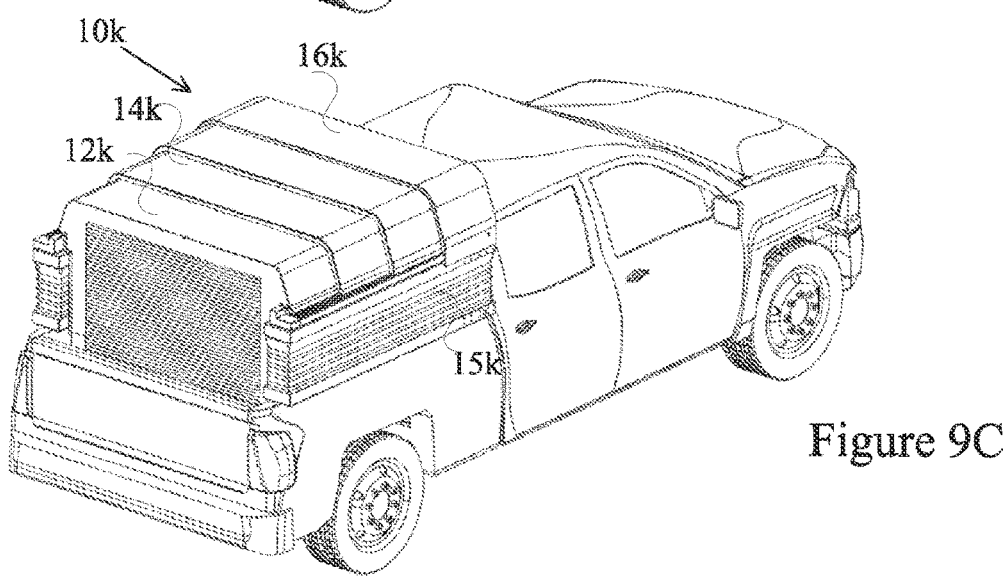

Reference is now made to FIG. 9A to FIG. 9C schematically illustrating the sliding foldable storage unit three different states, in accordance with some exemplary embodiments of the disclosed subject matter.

The Figures illustrates three possibilities of an endless number of possibilities to arrange the foldable storage unit in different enclosed volumes. It should be moted that there are many other arrangements to adjust the volume captured within the foldable and adjustable storage unit and the examples brought herein are by no means limiting the scope of the present subject matter. The example shown in FIG. 9A is of double side platforms 15*i* and 15*i*" mounted on the side of the rear load area, the platforms are elevated to their maximum possible height. The arch shaped sections 16*i*, 12*i* and 14*i* are in relatively congregated state so that the volume enclosed within the storage unit 10*i* is determined by those parameters.

It should be noted that the bottom portion of the arched section 12*i*, which acts as a back wall, has a descending portion that is telescopically and accord the height of the side walls. It can be seen in FIG. 9B that the lower portion of the section 12*j* is shorter than the parallel portion in section 12*i* of FIG. 9A. the lower portion is telescopic and is entering the portion that is above it so as to accommodate its length.

The example shown in FIG. 9B is of single platforms 15*j* mounted on the side of the rear load area, the platform is not elevated. The arch shaped sections 16*j*, 12*j* and 14*j* are extended substantially till the middle of the rear load area so that the volume enclosed within the storage unit 10*j* is determined by those parameters.

The example shown in FIG. 9C is of single side platforms 15*k* mounted on the side of the rear load area, the platform is elevated to its maximum possible height. The arch shaped sections 16*k*, 12*k* and 14*k* are in fully extended state so that the volume enclosed within the storage unit 10*k* is determined by those parameters.

Figure 10A:
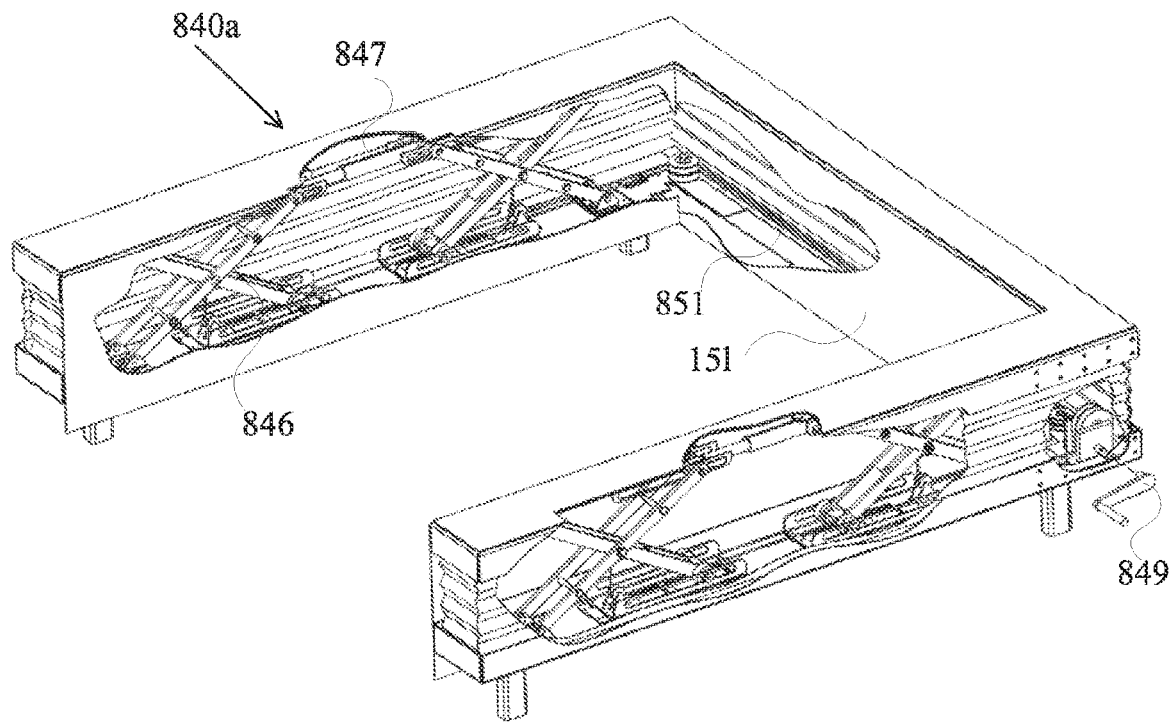
FIG. 10A schematically illustrates a height adjustment mechanism, without the pickup truck for better visualization, in accordance with an exemplary embodiment of the disclosed subject matter.
Figure 10B:
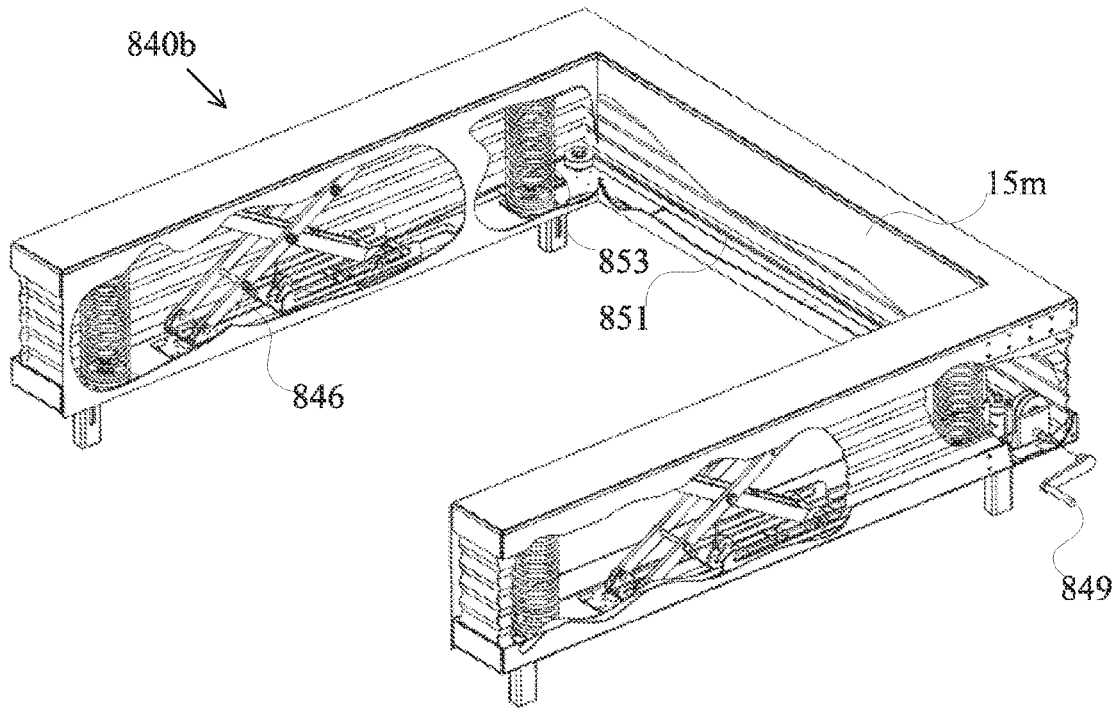
FIG. 10B schematically illustrates a height adjustment mechanism, without the pickup truck for better visualization, in accordance with another exemplary embodiment of the disclosed subject matter.

As mentioned herein before, one can use different types of height adjustment mechanisms. Reference is now made to FIGS. 10A and 10B schematically illustrating a height adjustment mechanism, without the pickup truck for better visualization, in accordance with an exemplary embodiment of the disclosed subject matter. In FIG. 10A, a platform 151 is shown with cut-offs in order to observe the interior of the structure that comprises the height adjustment mechanism 840*a*. Pair of scissors-type mechanism 846 as discussed herein before is connected from both sides to gas spring 847 that has a default state, in which it is expanded and pushes the scissors 846 to be in its maximum height. A manual operating lever 849 is provided with cables 851 that are connected to the scissor's mechanism.

In FIG. 10B, one can observe a platform 15*m* is shown with cut-offs in order to observe the interior of the structure that comprises the height adjustment mechanism 840*b*. Scissors-type mechanism 846 similarly as discussed herein before is connected on both sides to lateral springs 853 that has a default state, in which it is expanded and pushes the opposite ends of the platform to be separated so that the height or distance between the ends is maximum. A manual operating lever 849 is provided with cables 851 that are connected to the scissor's mechanism.

Figure 11:
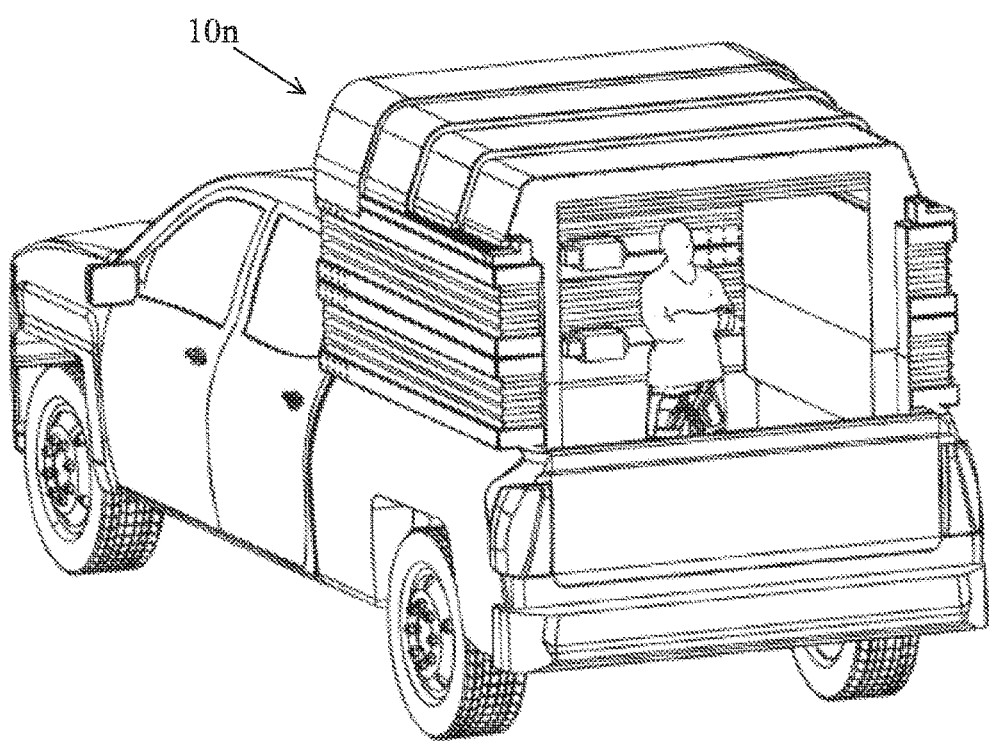
FIG. 11 schematically illustrates an isometric view of the sliding foldable storage unit deployed to its maximal capacity, in accordance with some exemplary embodiments of the disclosed subject matter.

Reference is now made to FIG. 11 schematically illustrated an isometric view of the sliding foldable storage unit deployed to its maximal capacity, in accordance with some exemplary embodiments of the disclosed subject matter. To evaluate the volume or height of the sliding storage unit 10*n*, a person is situated within the volume to see that a person can stand freely within the volume of the unit.

Figure 12A:
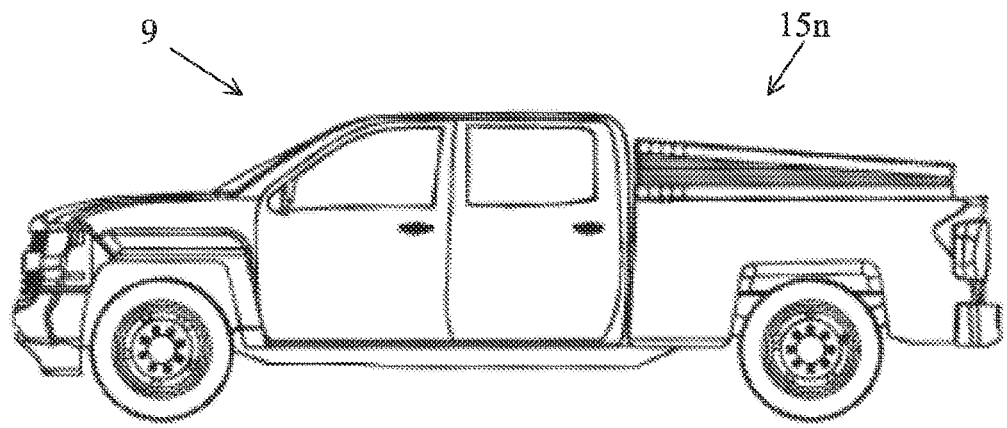
FIG. 12A schematically illustrates a side view of pickup truck with a storage unit having a tilted adjustment height mechanism, in accordance with some exemplary embodiment of the disclosed subject matter.
Figure 12B:
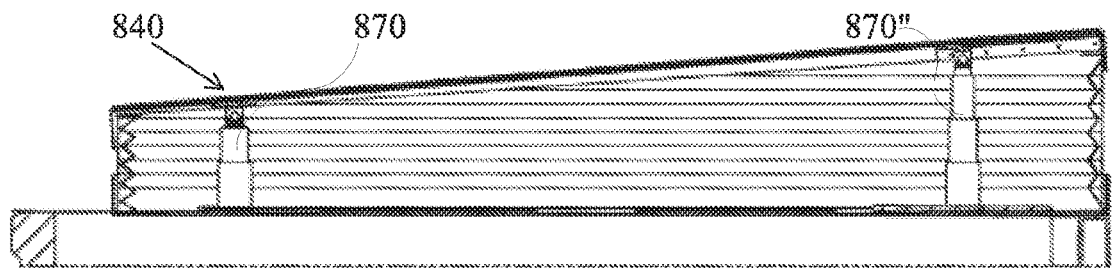
FIG. 12B schematically illustrates a cross sectional view of the inner mechanism allowing the height adjustment mechanism to be in a tilted state, in accordance with some 3
Figure 12C:
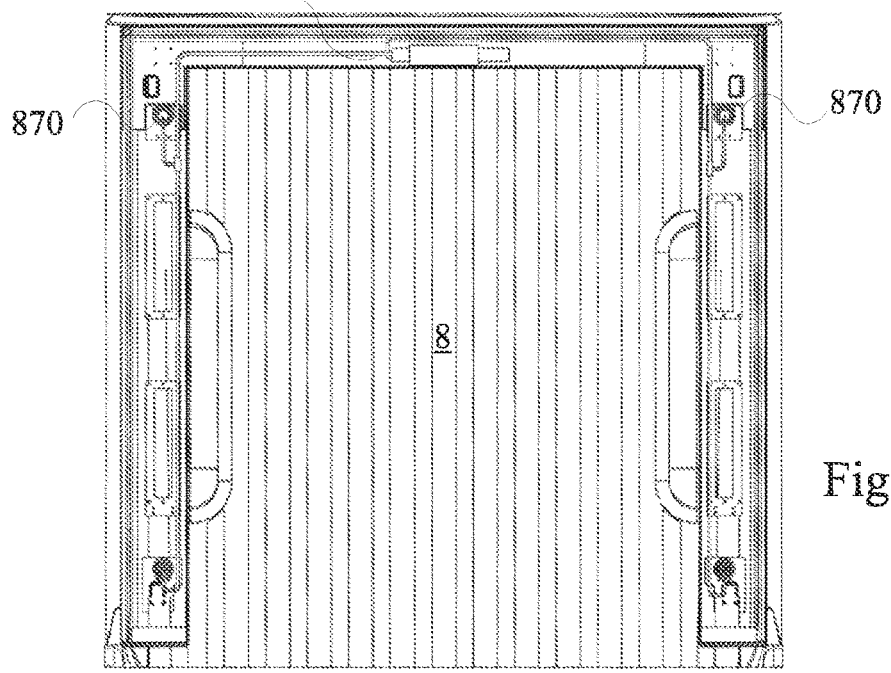
FIG. 12C schematically illustrates an upper cross-sectional view of the rear area of the truck with the tilted height adjustment mechanism shown in FIG. 12A.

Reference is now made to FIGS. 12*a* to 12C schematically illustrating a side view of pickup truck with a storage unit having a tilted adjustment height mechanism and the inner mechanism, and a cross sectional upper view, respectively, in accordance with some exemplary embodiment of the disclosed subject matter.

Pickup truck 9 is provided with a platform 15*n* that is built in such a manner that enables to elevate only a portion of the platform so that a tilted platform is formed as shown in FIG. 12A. The inner structure of the height elevated mechanism 840 can be seen. Preferably, two hydraulic cylinders 870 are used. The hydraulic cylinders 870 are occupying minimal area within the envelope of the platform and therefore, can be used in order to tilt the platform by elevating only one of the cylinders while the other cylinder from the other side stays low.

Optionally, a roof is mounted on the platform. The reason to tilt the platform, whether provided with a roof or not, is to allow the aerodynamic movement of the vehicle and in case there is a roof over the platform, if there is rain or snow, this will assist the snow to be removed and not to be too heavy on the unit.

In the cross sectional upper view, the height adjustment mechanism can be seen with the hydraulic cylinders 870 while in this figure, one can observe the air container with the air channels 893 can be seen. The cylinders can be also pneumatically operated with oil or electrically with an electric motor. In any case, the process is controlled. In this figure, the platform is seen to be mounted on the sides of the rear load area 8 of a pickup truck.

Figure 13:
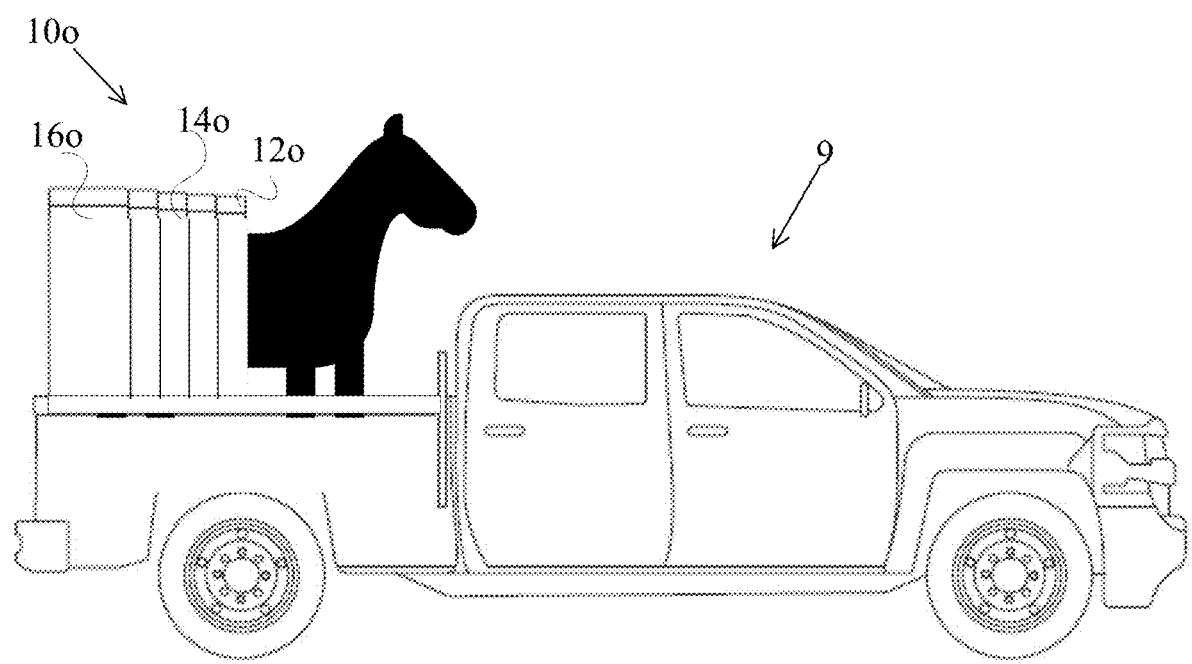
FIG. 13 schematically illustrates a reverse organized sliding storage unit use for transporting an animal, according to an exemplary embodiment of the present subject matter.

Reference is now made to FIG. 13 schematically illustrating a reverse organized sliding storage unit used for transporting an animal, according to an exemplary embodiment of the present subject matter. A sliding storage unit 10*o* comprises a back wall 16*o*, in this case organized to be adjacent to the tailgate 7 of the rear load area instead of the cabin as shown in the previous embodiments. At least one arched section 14*o* is provided to be adapted to slide from adjacently within the frame of the back wall 16*o* to extend outwardly. On the other side of the back wall 16*o*, a front wall 12*o* is provided. It can be seen that the opening of the storage unit is on the cabin side. In this case, animals such as a horse, as seen in the figure, can be transported in the truck 9. In case a smaller animal is desired to be transferred, another arrangement of the components of the sliding storage unit can be establish.

It should also be mentioned that the fixed portion can be substantially in the middle of the rear load area and the sliding portions can slide on both sides of the fixed portion. This is another arrangement that can be used in some situations.

It should be noted that the expandable storage unit may optionally be connected to the truck 9 or to another type of vehicle using hard connections, or soft materials such as ropes, belts, rings, etc.

It should be noted that the expandable storage unit may optionally further comprise internal shelves and benches. Such internal shelves and benches can optionally be of folding types, connected to the walls of the like blinds.

It should be noted that the expandable storage unit can optionally further comprise systems for providing heat, ventilation, and/or air-conditioning to the foldable storage unit.

It should be noted that the foldable storage unit can optionally be further comprised with internal light.

It should be noted that the expandable storage unit can optionally receive power from the electric system of the truck 9 or any vehicle it is installed on, and/or having an additional power source such as a battery, a generator and/or an auxiliary power connector in order to power the optional lights and/or optional heat, ventilation, and/or air-conditioning systems.

It should be noted that the expandable storage unit can optionally be mounted on an open trailer to be standing alone, or towed by a car or a pickup truck.

It should be noted that the width of the firm sections of the unit can be of any width so as to keep it rigid. It is also can be formed from materials that can be bullet proof, it is it used in areas of such hazard.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An extendable rigid storage unit to be deployed on a pickup truck having a cabin and a rear load area having sides and a tailgate, the extendable storage unit comprising:
   a stationary front wall having a length that is slightly shorter than a length between the sides of the rear load area, wherein the front wall is on the rear load area adjacent to the cabin or the tailgate;
   side walls mounted on the sides of the rear load area;
   two rails, each mounted on a corresponding side wall;
   a sliding back wall positioned opposite said front wall and capable of sliding on said two rails; and
   at least one sliding section disposed between the stationary front wall and the sliding back wall, wherein the at least one sliding section is capable of sliding on said two rails; wherein in a folded state, the at least one sliding section and the back wall are adjacent to the front wall and in a fully deployed state or partially deployed state, and the at least one sliding section is positioned aside the sliding back wall to form an enclosed volume,
   wherein in the folded state, the extendable storage unit occupies minimal area of the rear load area and in the deployed state or the partially deployed state, the sliding back wall is configured to extend away from the front wall when the back wall reaches the tailgate, and the extendable storage unit occupies a maximal area while the back wall can be fixed in any distance on the rear load area from the front wall, and
   wherein each side wall is height adjustable and wherein the side walls are enveloping a height adjustment mechanism and are made of a sheet of metal that is arranged in an accordion shape that can be extended and retracted according to a height that the height adjustment mechanism reaches.

2. The extendable storage unit of claim 1, wherein transforming the storage unit from the folded state to the deployed state and vice versa can be handled manually, mechanically, electrically, or automatically.

3. The extendable storage unit of claim 1, wherein the sliding sections and the sliding back wall are arched and have lower edges that are provided with wheels capable of sliding within and along the rails.

4. The extendable storage unit of claim 1, wherein each of the side walls accommodates a height adjustment mechanism.

5. The extendable storage unit of claim 4, wherein the height adjustment mechanism is based on rods connected by a hinge to form a scissor-like jack.

6. The extendable storage unit of claim 5, wherein the scissor-like jack is enhanced by springs.

7. The extendable storage unit of claim 4, wherein the height adjustment mechanism comprises a hydraulic or pneumatic telescopic cylinder.

\* \* \* \* \*